(12) United States Patent
Hirayama et al.

(10) Patent No.: US 8,689,588 B2
(45) Date of Patent: Apr. 8, 2014

(54) GLASS-MELTING DEVICE FOR PRODUCING GLASS FIBER AND METHOD FOR PRODUCING GLASS FIBER USING SAME

(75) Inventors: Norio Hirayama, Fukushima (JP);
Masahiko Takahashi, Fukushima (JP);
Naohiro Miyanaga, Fukushima (JP);
Kentarou Ogawa, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 50 days.

(21) Appl. No.: 13/255,459

(22) PCT Filed: Mar. 8, 2010

(86) PCT No.: PCT/JP2010/053796
§ 371 (c)(1),
(2), (4) Date: Oct. 18, 2011

(87) PCT Pub. No.: WO2010/104036
PCT Pub. Date: Sep. 16, 2010

(65) Prior Publication Data
US 2012/0055200 A1    Mar. 8, 2012

(30) Foreign Application Priority Data

| Mar. 9, 2009 | (JP) | P2009-055571 |
| May 25, 2009 | (JP) | P2009-125725 |
| Jul. 9, 2009 | (JP) | P2009-162901 |
| Jul. 16, 2009 | (JP) | P2009-168031 |

(51) Int. Cl.
*C03B 37/085* (2006.01)

(52) U.S. Cl.
USPC ............. 65/469; 65/474; 65/134.1; 65/134.2; 65/135.1

(58) Field of Classification Search
USPC ........... 65/471, 474, 495, 134.1, 134.2, 135.1
See application file for complete search history.

(56) References Cited

U.S. PATENT DOCUMENTS

| 3,406,021 A | 10/1968 | Day et al. |
| 3,689,046 A | 9/1972 | De Bie et al. |

(Continued)

FOREIGN PATENT DOCUMENTS

| DE | 3110085 A1 | 9/1982 |
| DE | 10055967 A1 | 5/2002 |

(Continued)

OTHER PUBLICATIONS

International Search Report for PCT/JP2010/053796.

(Continued)

*Primary Examiner* — Queenie Dehghan
(74) *Attorney, Agent, or Firm* — Morgan, Lewis & Bockius LLP

(57) ABSTRACT

An object of the present invention is to effectively reduce mixing of bubbles into a spun glass fiber. A glass-melting device 10 for producing glass fibers includes; a first glass-melting tank 12 exposed to a reduced-pressure atmosphere; a second glass-melting tank 14 and a third glass-melting tank 16 arranged below the first glass-melting tank 12; an ascending conduit 18 that sends up molten glass resulting from melting in the second glass-melting tank 14 to deliver the molten glass to the first glass-melting tank 12; a descending conduit 20 that sends the molten glass down from the first glass-melting tank 12 to deliver the molten glass to the third glass-melting tank 16; a decompression housing 22; and a bushing 24. The glass-melting device 10 further includes heating means for separately heating the first glass-melting tank 12, the second glass-melting tank 14, the third glass-melting tank 16, the ascending conduit 18, the descending conduit 20 and the bushing 24.

10 Claims, 15 Drawing Sheets

(56) References Cited

U.S. PATENT DOCUMENTS

| | | | |
|---|---|---|---|
| 3,998,686 A | 12/1976 | Meiling et al. | |
| 4,241,904 A * | 12/1980 | Nagashima et al. | 266/209 |
| 4,270,941 A | 6/1981 | Babbitt | |
| 4,541,865 A | 9/1985 | Sherwood | |
| 4,738,938 A | 4/1988 | Kunkle et al. | |
| 5,352,258 A * | 10/1994 | DeGreve et al. | 65/474 |
| 6,286,337 B1 | 9/2001 | Palmquist | |
| 6,405,564 B1 * | 6/2002 | Takei et al. | 65/157 |
| 2005/0268663 A1 | 12/2005 | Tomita et al. | |
| 2008/0050609 A1 * | 2/2008 | Abe et al. | 428/592 |
| 2008/0083250 A1 * | 4/2008 | Nagno et al. | 65/355 |
| 2008/0120997 A1 | 5/2008 | Takeshita et al. | |

FOREIGN PATENT DOCUMENTS

| | | |
|---|---|---|
| DE | 10116960 C1 | 8/2002 |
| DE | 10200232 C1 | 1/2003 |
| DE | 10200233 C1 | 4/2003 |
| EP | 0297404 A1 | 1/1989 |
| EP | 0759524 A1 | 2/1997 |
| EP | 0775671 A1 | 5/1997 |
| EP | 0963955 A1 | 12/1999 |
| EP | 0989099 A1 | 3/2000 |
| JP | 57-149839 | 9/1982 |
| JP | 61-072647 A | 4/1986 |
| JP | 2-42777 | 9/1990 |
| JP | 2-221129 | 9/1990 |
| JP | 3-033020 | 2/1991 |
| JP | 05-195045 A | 8/1993 |
| JP | 11-050131 A | 2/1999 |
| JP | 11-171554 | 6/1999 |
| JP | 11-236237 | 8/1999 |
| JP | 2000-128549 | 5/2000 |
| JP | 2000-302456 | 10/2000 |
| JP | 2002-087826 A | 3/2002 |
| JP | 2003192373 | 7/2003 |
| JP | 2006-206439 A | 8/2006 |
| JP | 2007-022862 A | 2/2007 |
| JP | 2008-266072 A | 11/2008 |
| WO | 2005/009911 A2 | 2/2005 |
| WO | 2006/059576 A1 | 6/2006 |
| WO | 2006/095523 | 9/2006 |

OTHER PUBLICATIONS

Extended Search Report issued in corresponding European Patent Application No. 10750791.5 dated Sep. 17, 2012.

International Preliminary Report on Patentability and Written Opinion issued in related International Application No. PCT/JP2010/053799 dated Oct. 27, 2011.

Search Report issued in counterpart European Patent Application No. 10750789.9 dated Jul. 13, 2012.

Office Action issued in counterpart U.S. Appl. No. 13/255,463 dated Jun. 5, 2013.

* cited by examiner

Fig.6
(a)
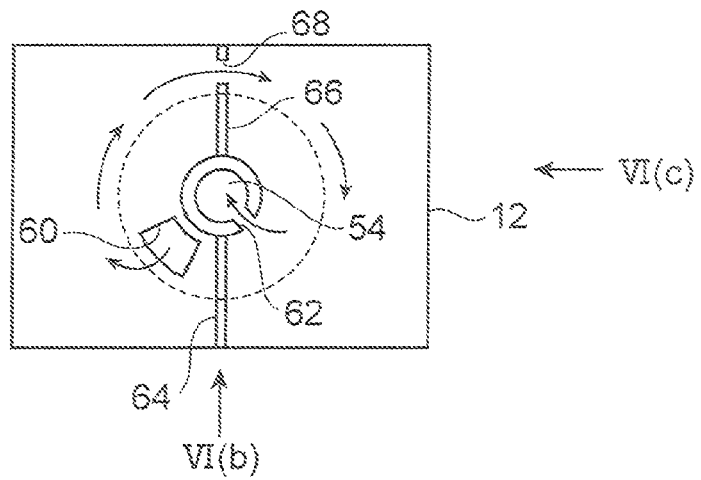
(b)
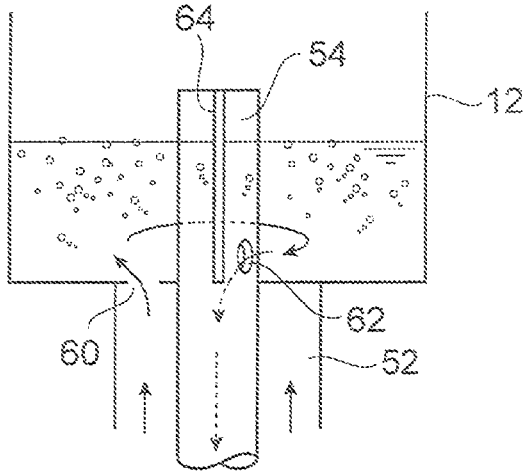
(c)
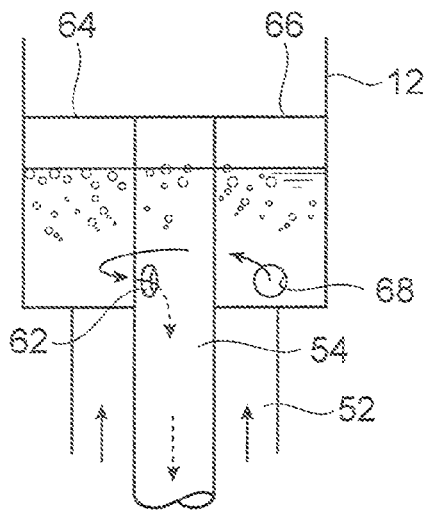

_(1)_

GLASS-MELTING DEVICE FOR PRODUCING GLASS FIBER AND METHOD FOR PRODUCING GLASS FIBER USING SAME

CROSS-REFERENCE TO RELATED APPLICATIONS

The present application is a U.S. National Phase Application of International Application PCT/JP2010/053796, filed Mar. 8, 2010, which claims the benefit of Japanese Patent Application Nos. 2009-055571, filed Mar. 9, 2009, 2009-125725, May 25, 2009, 2009-162901, filed Jul. 9, 2009, and 2009-168031, filed Jul. 16, 2009, which are hereby incorporated by reference in their entirety.

TECHNICAL FIELD

The present invention relates to a glass-melting device for producing glass fibers which melts glass raw materials for spinning glass fibers, and a method for producing glass fibers using the same.

BACKGROUND ART

A direct melt process and a marble melt process have been used in the production of glass fibers as typical melting methods for forming a plurality of glass fibers by fiberizing a molten glass, gathering the glass fibers, and spinning them as glass fiber yarn. In the direct melt process, powders or particulate matters of various mineral matters are mixed as glass raw materials, injected into a melting furnace, and melted to produce a molten glass. On the other hand, in the marble melt process, glass gobs referred to as marbles prepared by solidifying a molten glass are remelted to produce a molten glass (for example, see Patent Literature 1).

For spinning glass fibers, glass raw materials of mineral matters are melted as described above. However, bubbles are unfavorably generated during melting. The generated bubbles may be bubbles caused when raw materials are injected into a melting furnace, bubbles of volatile components (carbonate, sulfate, oxide) contained in the raw materials, bubbles generated at an interface of a zirconia brick of the melting furnace, or bubbles generated by reaction with platinum in the melting furnace.

Due to these bubbles, some bubbles may exist in glass fibers during subsequent spinning. When this happens, glass fiber yarn may be unfavorably cut during spinning or mechanical strength or electrical insulation of a molded article using spun glass fiber yarn as a reinforcement material may be reduced.

Thus, the bubbles are reduced by adding clarifying agent to the glass raw materials or solid raw materials or attaching a valve to an outlet of the melting furnace as disclosed in Patent Literature 1.

Also, as in Patent Literature 2, there is a proposed technique in which glass is melted in a preliminary melting tank and the molten glass is introduced into a melting tank under a reduced-pressure atmosphere to increase the diameters of the bubbles included in the molten glass, thereby increasing the buoyancy of the bubbles in order to achieve defoaming.

Furthermore, as in Patent Literatures 3 and 4, there are proposed techniques in which molten glass is guided into a melting tank under a reduced pressure via an ascending tube to perform defoaming in the melting tank under a reduced pressure and the diameters of the bubbles included in the molten glass are increased in the course of guiding the molten glass from the melting tank to another melting tank via a descending tube, thereby increasing the buoyancy of the bubbles in order to achieve defoaming.

CITATION LIST

Patent Literature

[Patent Literature 1] Japanese Patent Laid-Open No. 2003-192373
[Patent Literature 2] Japanese Patent Publication No. 02-042777
[Patent Literature 3] Japanese Patent Laid-Open No. 02-221129
[Patent Literature 4] Japanese Patent Laid-Open No. 2000-302456

SUMMARY OF INVENTION

Technical Problem

However, addition of a clarificant is unfavorable from the perspective of environmental problems and costs, and also, provision of valves at outlets of a melting furnace as in Patent Literature 1 cannot effectively reduce the mixing of bubbles.

Furthermore, in glass fiber production, the weight of glass spun per unit time is small, and thus, the flow rate of the molten glass flowing in a conduit is around 50 to 5000 g/minute in general.

Thus, in the method in which glass is melted in a preliminary melting tank and the molten glass is introduced into a melting tank under a reduced pressure as in Patent Literature 2, the low-viscosity molten glass is sucked from the preliminary melting tank by a high pressure-reducing force of the melting tank under a reduced pressure, and thus, it is difficult to adjust the flow rate of the introduced molten glass, making it difficult to perform high-precision control of the flow rate via a needle valve made of platinum or an introduction tube enabling temperature adjustment.

Meanwhile, in the method in which molten glass is guided into a melting tank under a reduced pressure via an ascending tube to perform defoaming in the melting tank under a reduced pressure and then is guided from the melting tank to another melting tank via a descending tube as in Patent Literatures 3 and 4, unless a large amount of molten glass is made to flow in the ascending tube and the descending tube to heat the ascending tube and the descending tube by means of the amount of heat brought by the molten glass itself, the molten glass is cooled and solidified in the middle of the tubes, which may result in the apparatus halting. In other words, the melting tanks described in Patent Literatures 3 and 4 are ones suitable for a case where a large amount of glass such as thousands of tons or more per month is melt. In this case, the ascending tube and the descending tube are heated by the amount of heat brought by the molten glass, enabling maintenance of the melted state of the glass inside the tubes. However, in glass fiber production, the weight of glass melted in one melting apparatus per month is hundreds of tons or less in general, and thus, the melted state of the glass inside the ascending tube and the descending tube cannot be maintained by the amount of heat brought by the molten glass.

Therefore, an object of the present invention is to provide a glass-melting device for producing glass fibers, which is capable of effectively reducing mixing of bubbles into a spun glass fiber, and a method for producing glass fibers using the same.

Solution to Problem

A glass-melting device for producing glass fibers according to the present invention includes: a first glass-melting tank that is exposed to a reduced-pressure atmosphere by a sucking device; a first conduit part and a second conduit part extending downward from the first glass-melting tank; a heat-insulating housing integrally covering the first conduit part and the second conduit part; a second glass-melting tank provided below the first conduit part and exposed to an atmospheric-pressure atmosphere; a third glass-melting tank provided below the second conduit part and exposed to an atmospheric-pressure atmosphere; a bushing provided at a bottom part of the third glass-melting tank, the bushing including a number of nozzles; and heating means for separately heating at least any one of the first conduit part and the second conduit part, the first glass-melting tank, the second glass-melting tank, the third glass-melting tank and the bushing.

When the glass-melting device for producing glass fibers according to the present invention is made to enter an operating state in which the first conduit part and the second conduit part are filled with molten glass, molten glass in the second glass-melting tank ascends in the first conduit part by the siphon principle and is introduced into the first glass-melting tank, and then descends in the second conduit part and is introduced into the third glass-melting tank and spun into a glass fiber via the bushing. Consequently, the levels of the liquid surfaces of the molten glass in the second glass-melting tank and the third glass-melting tank become the same, and thus, even if liquid level fluctuations occur in the first glass-melting tank due to, e.g., fluctuations in air pressure of an atmosphere in the first glass-melting tank, liquid level fluctuations in the third glass-melting tank from which a glass fiber is spun via the bushing can be suppressed. Consequently, generation of bubbles brought from a surface of contact between a wall surface of the third glass-melting tank and the molten glass can be suppressed, enabling effective reduction of mixing of bubbles into a spun glass fiber.

Furthermore, a glass raw material can be put into the second glass-melting tank exposed to an atmospheric-pressure atmosphere, and thus, the liquid level of molten glass changing as a result of a glass fiber being spun via the bushing can easily be adjusted. In addition, the first glass-melting tank can be made airtight, and thus, fluctuations in air pressure of the atmosphere in the first glass-melting tank can be suppressed. Consequently, liquid level fluctuations in the third glass-melting tank can further be suppressed.

Furthermore, a glass raw material is melt in the second glass-melting tank, enabling downsizing of the first glass-melting tank exposed to a reduced-pressure atmosphere, and thus, a liquid level fluctuation in the third glass-melting tank can further be suppressed even though liquid level fluctuations occur in the first glass-melting tank. In addition, in order to reduce bubbles in a glass fiber, it is preferable that the first glass-melting tank be arranged near a spinning device that spins molten glass, that is the third glass-melting tank, and such arrangement can easily be attained by downsizing the first glass-melting tank.

In order to expose the first glass-melting tank to a reduced-pressure atmosphere, it is necessary that the first glass-melting tank have a predetermined difference in height from the second glass-melting tank and the third glass-melting tank, and thus, the first conduit part and the second conduit part are inevitably long. Meanwhile, the weight of glass spun per unit time is extremely small, requiring a long time for molten glass to pass through the first conduit part and the second conduit part. Accordingly, heating at least any one of the first conduit part and the second conduit part and covering the first conduit part and the second conduit part with the heat-insulating housing enables molten glass introduced in the first conduit part and the second conduit part to be prevented from being solidified due to a temperature decrease. In addition, as a result of integrally covering the first conduit part and the second conduit part with the heat-insulating housing, the structure of the heat-insulating housing can be simplified, enabling efficient heating and temperature maintenance of the first conduit part and the second conduit part.

As described above, in the glass-melting device for producing glass fibers according to the present invention, the flow rate of molten glass in the first conduit part and the second conduit part is extremely small, and thus, the first conduit part and the second conduit part can have a small diameter, and in addition, the first glass-melting tank can be downsized. Consequently, in the present invention, the first conduit part and the second conduit part can be integrally covered by the heat-insulating housing.

Furthermore, as a result of the heating means separately heating at least any one of the first conduit part and the second conduit part, the first glass-melting tank, the second glass-melting tank, the third glass-melting tank and the bushing, optimum temperature conditions can be provided for the respective regions, enabling suppression of generation of bubbles from molten glass due to reboiling.

In this case, it is preferable that a pressure inside the heat-insulating housing be reduced by sucking means. Thus, as a result of reducing a pressure inside the heat-insulating housing, buckling of the first conduit part and the second conduit part due to pressure reduction in the first glass-melting tank become difficult to occur, enabling a decrease in wall thickness of the first conduit part and the second conduit part. Consequently, especially where the first conduit part and the second conduit part are manufactured by an expensive material such as platinum, for example, the cost can be reduced.

Furthermore, the heating means may include an electrode part on each of an upper part and a lower part of at least any one of the first conduit part and the second conduit part, and apply current to the electrode parts, thereby heating the electrode parts. Thus, as a result of applying current to the electrode part provided at each of the upper part and the lower part of at least any one of the first conduit part and the second conduit part to heat the electrode part, at least any one of the first conduit part and the second conduit part can be heated in its entirety, and thus, heating and temperature maintenance of molten glass introduced in at least any one of the first conduit part and the second conduit part can properly be performed.

Also, at a lower part of at least any one of the first conduit and the second conduit, a conduit branch part branching from the lower part and extending upward may be formed, and the heating means may include an electrode part on each of an upper part of at least any one of the first conduit part and the second conduit part or the first melting tank, and the conduit branch part, and apply current to the electrode parts, thereby heating the electrode parts. Thus, as a result of providing an electrode part at the conduit branch part branching from the lower part of the conduit, a predetermined distance can be provided between a part connected to the electrode part and the conduit, enabling a temperature of the lower end part of the conduit to be also raised to a stable set temperature. Consequently, the temperature of molten glass introduced in the conduit can properly be raised.

Furthermore, it is preferable that the first conduit part and the second conduit part be at least partially integrally configured. As a result of integrally configuring the first conduit part and the second conduit part as stated above, the strengths of the first conduit part and the second conduit part can be enhanced, making buckling of the first conduit part and the second conduit part difficult to occur. Consequently, an atmospheric pressure can be provided inside the heat-insulating housing, eliminating the need to provide strict sealing between the first conduit part and the second conduit part, and the heat-insulating housing. Consequently, the need to provide a specific mechanism to absorb an expansion/contraction difference between the first conduit part and the second conduit part, and the heat-insulating housing due to thermal expansion is eliminated, enabling a part of connection between the first conduit part and the second conduit part, and the heat-insulating housing to have a simple configuration.

Furthermore, the first conduit part and the second conduit part may be included in a double-tube structure, and at least any one of the first conduit part and the second conduit part may be arranged in an inner part of any other one of the first conduit part and the second conduit part. As a result of the first conduit part and the second conduit part being included in a double-tube structure as stated above, heating any one of the first conduit part and the second conduit part enables any other one of the first conduit part and the second conduit part to be indirectly heated by heat radiated by the heating. Consequently, the first conduit part and the second conduit part can efficiently be heated. In addition, there is almost no pressure difference between the inside and the outside of the inner-side conduit part, enabling a decrease in wall thickness of the inner-side conduit.

In this case, it is preferable that: first conduit part be arranged on an outer side of the double-tube structure; and the second conduit part be arranged on an inner side of the double-tube structure. As a result of providing such configuration as stated above, heating only the first conduit part results in the second conduit part being indirectly heated by the heating of the first conduit part, and thus, the temperature of the second conduit part can easily be made to be lower than the temperature of the first conduit part. Consequently, generation of bubbles due to reboiling can be suppressed.

Also, the first conduit part and the second conduit part may be integrally joined to each other. Since the first conduit part and the second conduit part are joined to each other as stated above, when the first conduit part and the second conduit part are heated, the first conduit part and the second conduit part thermally expand in a substantially same behavior. Thus, a failure caused due to an expansion/contraction difference between the first conduit part and the second conduit part due to thermal expansion can be prevented.

In this case, it is preferable that the first conduit part and the second conduit part be formed inside one conduit by forming a partition wall inside the conduit. As a result of the first conduit part and the second conduit part being formed inside one conduit by forming a partition wall inside the conduit as stated above, the first conduit part and the second conduit part can easily be fabricated. In addition, the conduit is reinforced by the partition wall inside the conduit, enabling a decrease in wall thickness of the first conduit part and the second conduit part. In other words, properly setting the wall thicknesses of the first conduit part and the second conduit part enables suppression of occurrence of buckling of the conduit even though the inside of the heat-insulating housing has an atmospheric pressure without pressure reduction.

Furthermore, it is preferable that the first glass-melting tank be provided with at least any one of an upper partition plate forming an opening at a bottom part of the first glass-melting tank and dividing an upper part of molten glass, and a lower partition plate including an opening in the vicinity of a liquid surface of molten glass and dividing the bottom part of the first glass-melting tank. As a result of providing the upper partition plate as stated above, bubbles floating as a result of being removed from molten glass can be prevented from going with the flow of the molten glass, enabling the bubbles to be prevented from flowing into the second conduit part. Meanwhile, as a result of providing the lower partition plate, the molten glass does not flow into the second conduit part unless the molten glass climbs over the lower partition plate, and thus, in the first glass-melting tank, retention time sufficient for removing bubbles from the molten glass can be secured. In addition, the bubbles removed from the molten glass can be prevented from being carried by a fast flow at the bottom part of the first glass-melting tank and flowing into the second conduit part. As a result, mixing of bubbles into a spun glass fiber can more effectively be reduced.

A method for producing glass fibers according to the present invention includes a method for producing glass fibers using the above-stated glass-melting device for producing glass fibers, the method including: exposing the first glass-melting tank to a reduced-pressure atmosphere to introduce molten glass resulting from a glass raw material being melted in the second glass-melting tank to the first glass-melting tank via the first conduit part, and introducing the molten glass to the third glass-melting tank via the second conduit part; separately heating at least any one of the first conduit part and the second conduit part, the first glass-melting tank, the second glass-melting tank, the third glass-melting tank and the bushing; and spinning a glass fiber from the nozzles of the bushing.

In the method for producing glass fibers according to the present invention, as a result of exposing the first glass-melting tank to a reduced-pressure atmosphere to introduce molten glass resulting from a glass raw material being melted in the second glass-melting tank to the first glass-melting tank via the first conduit part, and introducing the molten glass to the third glass-melting tank via the second conduit part, the molten glass is introduced from the second glass melting into the third glass-melting tank through the first glass-melting tank by the siphon principle, and a glass fiber is spun via the bushing. Consequently, liquid levels of the molten glass in the second glass-melting tank and the third glass-melting tank become the same, and thus, even though liquid level fluctuations occur in the first glass-melting tank due to, e.g., fluctuations in air pressure of an atmosphere in the first glass-melting tank, liquid level fluctuations in the third glass-melting tank from which a glass fiber is spun via the bushing can be suppressed. Consequently, generation of bubbles brought from the surface of contact between the wall surface of the third glass-melting tank and the molten glass can be suppressed, enabling effective reduction of mixing of bubbles into a spun glass fiber.

Furthermore, as a result of separately heating at least any one of the first conduit part and the second conduit part, the first glass-melting tank, the second glass-melting tank, the third glass-melting tank and the bushing, optimum temperature conditions can be provided for the respective regions, enabling suppression of generation of bubbles from the molten glass due to reboiling.

In this case, it is preferable that a liquid surface of the molten glass in the first glass-melting tank be made to be higher than a liquid surface of the molten glass in each of the second glass-melting tank and the third glass-melting tank by 250 cm or more. Consequently, an air pressure in the first glass-melting tank can be made to be lower than an atmospheric pressure by around 0.4 to 0.9 atmospheres or more. Under such degree of reduced-pressure atmosphere, a gas in the molten glass continuously diffuses inside the existing bubbles, resulting a sharp increase in the diameters of the bubbles, enabling provision of a large defoaming effect.

Furthermore, it is preferable that a sum of the area of the liquid surface of the molten glass in the second glass-melting tank and the area of the liquid surface of the molten glass in the third glass-melting tank be made to be ten times or more the area of the liquid surface of the molten glass in the first glass-melting tank. Consequently, since the levels of the liquid surfaces of the molten glass in the second glass-melting tank and the levels of the liquid surfaces of the molten glass in the third glass-melting tank are the same, even though liquid level fluctuations occur in the first glass-melting tank due to, e.g., fluctuations in air pressure of an atmosphere in the first glass-melting tank, fluctuations in liquid level of the liquid surface of the molten glass in the third glass-melting tank can be made to small. Consequently, generation of bubbles brought from the surface of contact between the wall surface of the third glass-melting tank and the molten glass can be suppressed. Furthermore, fluctuations in thickness of a spun glass fiber can be suppressed, enabling suppression of variation in strength and/or electrical characteristics of molded products due to fluctuations in the count of the glass fiber.

Advantageous Effects of Invention

The present invention enables mixing of bubbles into a spun glass fiber to be effectively reduced.

BRIEF DESCRIPTION OF DRAWINGS

FIG. 2(a) is a partially-fractured front view; and FIG. 2(b) is a cross-sectional view along line b-b in FIG. 2(a).

FIG. 6 includes diagrams showing a flow of molten glass in the first glass-melting tank.

FIG. 14(a) is a partially-fractured front view; and FIG. 14(b) is a cross-sectional diagram along line b-b in FIG. 14(a).

DESCRIPTION OF EMBODIMENTS

Hereinafter, preferred embodiments of a glass-melting device for producing glass fibers and a method for producing glass fibers using the same according to the present invention will be described in detail with reference to the drawings. Throughout the drawings, parts identical or corresponding to each other are provided with a same reference number, and a repetitive description thereof will be omitted.

First Embodiment

Figure 1:
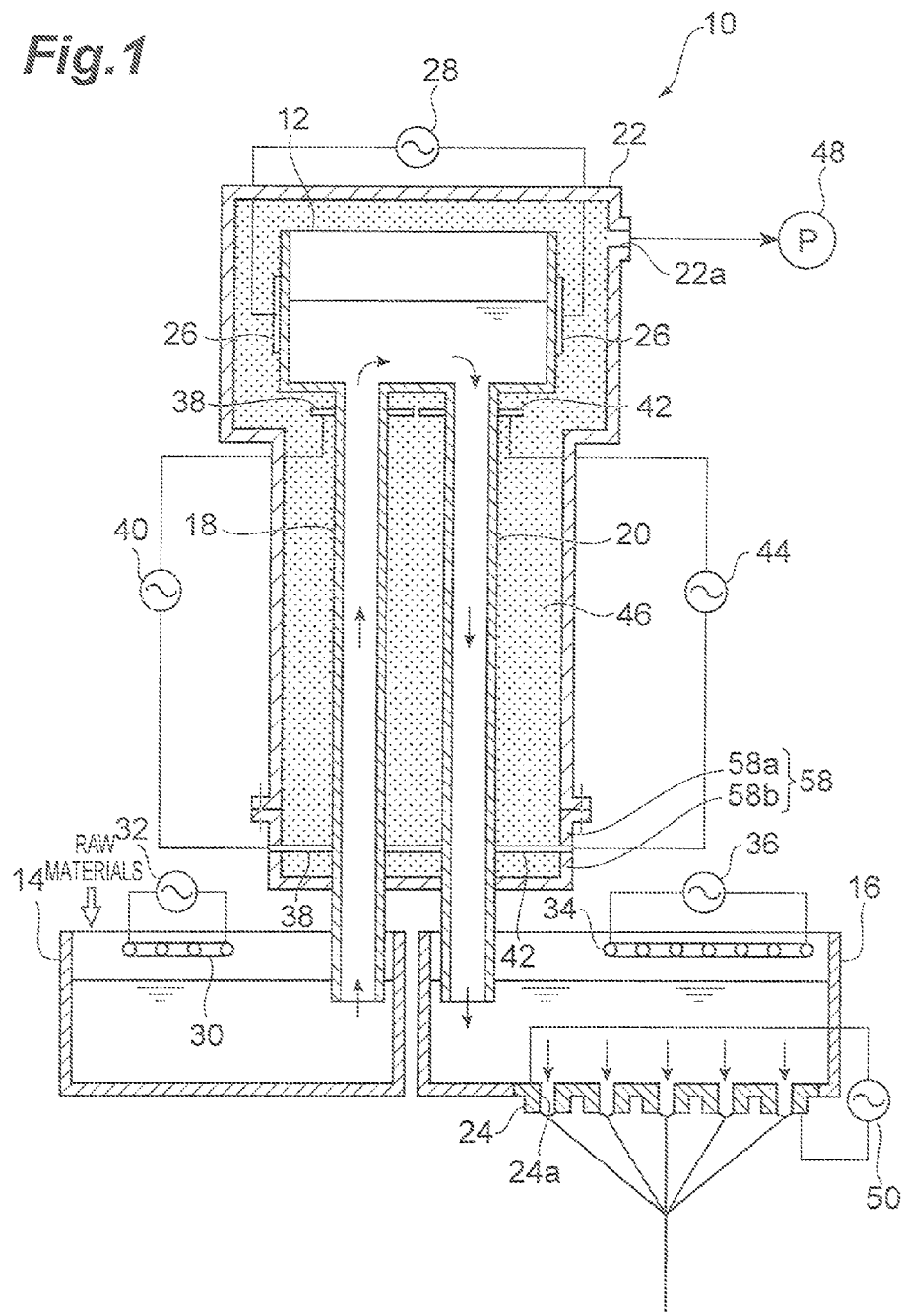
FIG. 1 is a cross-sectional diagram showing a configuration of a glass-melting device for producing glass fibers according to a first embodiment.

FIG. 1 is a cross-sectional diagram showing a configuration of a glass-melting device for producing glass fibers according to a first embodiment. As illustrated in FIG. 1, a glass-melting device 10 for producing glass fibers (hereinafter also referred to as "glass-melting device") includes a first glass-melting tank 12, a second glass-melting tank 14, a third glass-melting tank 16, an ascending conduit 18, a descending conduit 20, a decompression housing 22 and a bushing 24.

The first glass-melting tank 12 heats molten glass and maintains the temperature of the molten glass, and an upper part of the first glass-melting tank 12 is opened.

The first glass-melting tank 12 includes heating means for heating molten glass and maintaining the temperature of the molten glass. The heating means includes a pair of electrode parts 26 connected to opposing side surfaces of the first glass-melting tank 12, and a power supply 28 that supplies current to the electrode parts 26. The heating means makes the tank heat itself by applying current to the tank from the electrode parts 26. For self-heating, at least inner walls of the tank are preferably formed of a material that generates heat upon current being applied thereto, for example, platinum or a platinum alloy. The heating means may be, e.g., a burner or an electric heater.

The second glass-melting tank 14 is arranged below the first glass-melting tank 12. Glass raw materials such as glass powder, molten glass and a glass gob are put into the second glass-melting tank 14 to melt these glass raw materials in the second glass-melting tank 14. An upper portion of the second glass-melting tank 14 is opened and exposed to an atmospheric-pressure atmosphere.

The second glass-melting tank 14 includes heating means for melting glass raw materials. The heating means includes an electric heater including a heating wire 30 arranged at an upper part of the second glass-melting tank 14, and a power supply 32 that supplies current to the heating wire 30. The heating means may be a burner, or one that applies current to the tank via electrodes connected to the second glass-melting tank 14 to make the tank heat itself. For self-heating, at least inner walls of the tank are preferably formed of a material that generates heat upon current being applied thereto, for example, platinum or a platinum alloy.

The third glass-melting tank 16, which is arranged below the first glass-melting tank 12, heats molten glass and maintains the temperature of the molten glass. An upper part of the third glass-melting tank 16 is opened and exposed to an atmospheric-pressure atmosphere.

The third glass-melting tank 16 includes heating means for heating molten glass. The heating means includes an electric heater including a heating wire 34 arranged at the upper part of the third glass-melting tank 16, and a power supply 36 that supplies current to the heating wire 34. The heating means may be a burner, or one that makes the tank heat itself by applying current to the tank via electrodes connected to the third glass-melting tank 16. For self-heating, at least inner walls of the tank are preferably formed of a material that generates heat upon current being applied thereto, for example, platinum or an platinum alloy.

Preferably, each of the second glass-melting tank 14 and the third glass-melting tank 16 is formed to have a size such that the area resulting from adding up the liquid surface of the molten glass in the second glass-melting tank 14 and the liquid surface of the molten glass in the second glass-melting tank 14 is ten times or more the area of the liquid surface of the molten glass in the first glass-melting tank 12.

The ascending conduit 18 sends up molten glass resulting from melting in the second glass-melting tank 14 to deliver the molten glass to the first glass-melting tank 12, and is formed in an elongated cylindrical shape extending downward from the first glass-melting tank 12 to the second glass-melting tank 14.

The ascending conduit 18 includes heating means for heating the molten glass. The heating means includes a pair of flanged electrode parts 38 provided on an upper wall surface and a lower wall surface of the ascending conduit 18, and a power supply 40 that supplies current to the electrode parts 38. The heating means makes the ascending conduit 18 heat itself by applying current to the ascending conduit 18 via the electrode parts 38. Accordingly, the ascending conduit 18 includes a material that generates heat upon current being applied thereto, for example, platinum or a platinum alloy. The electrode part 38 may be provided on a wall surface of the first glass-melting tank 12 instead of the upper wall surface of the ascending conduit 18. In this case, it is preferable that the electrode part 38 be provided on a bottom part, or a lower part of a side part, of the first glass-melting tank 12 so as not to be an obstacle to the heating means of the first glass-melting tank 12.

The descending conduit 20 sends the molten glass down from the first glass-melting tank 12 to deliver the molten glass to the third glass-melting tank 16, and is formed in an elongated cylindrical shape extending downward from the first glass-melting tank 12 to the third glass-melting tank 16.

The descending conduit 20 includes heating means for heating the molten glass. The heating means includes a pair of flanged electrode parts 42 provided on an upper wall surface and a lower wall surface of the descending conduit 20, and a power supply 44 that supplies current to the electrode parts 42. The heating means makes the descending conduit 20 heats itself by applying current to the descending conduit 20 via the electrode part 42. Accordingly, the descending conduit 20 is formed of a material that generates heat upon current being applied thereto, for example, platinum or a platinum alloy. The electrode part 42 may be provided on a wall surface of the first glass-melting tank 12 instead of the upper wall surface of the descending conduit 20. In this case, it is preferable that the electrode part 42 be provided on a bottom part, or a lower part of a side part, of the first glass-melting tank 12 so as not to be an obstacle to the heating means of the first glass-melting tank 12.

The decompression housing 22 exposes the first glass-melting tank 12, the ascending conduit 18 and the descending conduit 20 to a reduced-pressure atmosphere, and integrally covering the first glass-melting tank 12, the ascending conduit 18 and the descending conduit 20 in an airtight manner in a state in which lower ends of the ascending conduit 18 and the descending conduit 20 project therefrom. A material and structure of the decompression housing 22 are not specifically limited as long as the material and structure have airtightness and strength, and the decompression housing 22 is preferably formed of a metal material such as stainless steel.

A heat insulating material 46 for heat-insulating efficiency enhancement is accommodated in a space among the decompression housing 22, the first glass-melting tank 12, the ascending conduit 18 and the descending conduit 20. The heat insulating material 46 provides heat insulation among the decompression housing 22, the first glass-melting tank 12, the ascending conduit 18 and the descending conduit 20, and lowers the temperature of the decompression housing 22 to a temperature equal to or lower than a heatproof temperature. Accordingly, the heat insulating material 46 is preferably formed of a material that lowers the temperature of the decompression housing 22 to the temperature equal to or lower than the heatproof temperature and retains the structure for a long time, preferably, insulating firebricks, which are excellent in shape retention property and economic efficiency, or an elastic heat insulating material having an elastic structure, for example.

Upon the ascending conduit 18 and the descending conduit 20 being heated, the ascending conduit 18 and the descending conduit 20, and the decompression housing 22 expand/contract due to thermal expansion. However, a contraction/expansion difference occurs between the ascending conduit 18 and the descending conduit 20, and the decompression housing 22 because of the difference in thermal expansion between them. Therefore, the decompression housing 22 is provided with a non-illustrated expansion/contraction mechanism that absorbs the contraction/expansion difference between the ascending conduit 18 and the descending conduit 20, and the decompression housing 22.

A suction opening 22a for pressure reduction, which is connected to a sucking device 48, is provided at a side wall of the decompression housing 22.

The sucking device 48 sucks a gas inside the decompression housing 22 by means of a vacuum pump to provide an reduced-pressure atmosphere inside the decompression housing 22.

The decompression housing 22 is connected to the ascending conduit 18 and the descending conduit 20 at lower end parts of the ascending conduit 18 and the descending conduit 20. Each of the connection parts has an airtight structure ensuring airtightness between the ascending conduit 18 and the descending conduit 20, and the decompression housing 22, and includes a non-illustrated sealing member such as an O-ring or packing provided between them. The details are provided later.

The bushing 24 is provided at a bottom part of the third glass-melting tank 16. The bushing 24 includes a number of (for example, around 100 to 4000) nozzle 24a for spinning.

The bushing 24 includes heating means for heating the molten glass. The heating means includes non-illustrated electrode parts provided on the bushing 24, and a power supply 50 that supplies current to the electrode parts. The heating means makes the bushing 24 heat itself by applying current to the bushing 24 via the electrode parts. Accordingly, the bushing 24 is formed of a material that generates heat upon current being applied thereto, for example, platinum or a platinum alloy.

The above-described respective heating means in the first glass-melting tank 12, the second glass-melting tank 14, the third glass-melting tank 16, the ascending conduit 18, the descending conduit 20 and the bushing 24 allow separate thermal adjustments.

Figure 2:
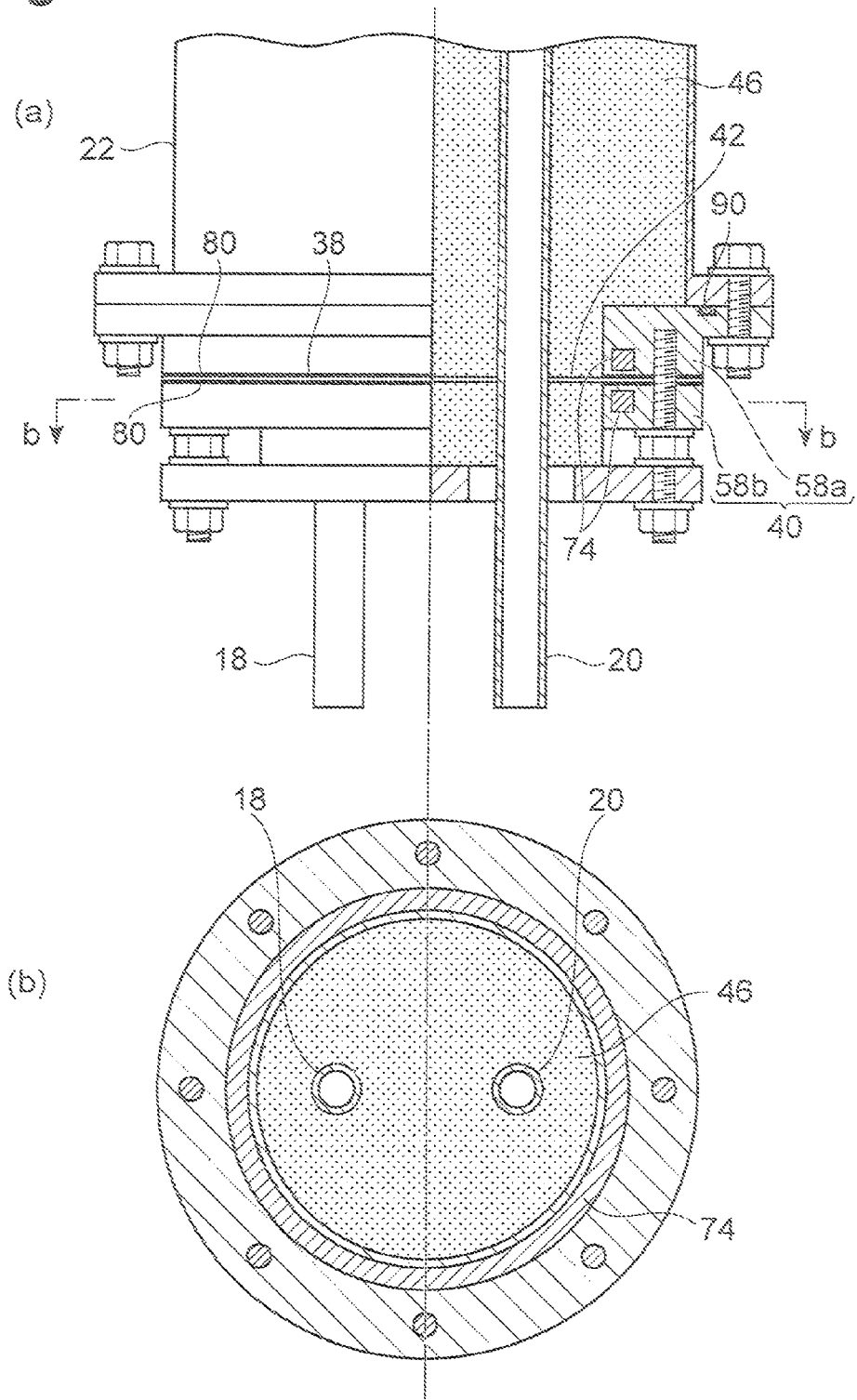
FIGS. 2(a) and 2(b) include diagrams showing a manner of connection between conduits and a decompression housing at lower portions of the conduits.

Here, as described above, since the decompression housing 22 covers the ascending conduit 18 and the descending conduit 20 as well, connection between the lower parts of the ascending conduit 18 and the descending conduit 20, and the decompression housing 22 is important. Therefore, in the present embodiment, as illustrated in FIG. 2, the lower parts of the ascending conduit 18 and the descending conduit 20 and the decompression housing 22 are connected via a flange 58 including water-cooled tubes 74. FIG. 2 provides diagrams showing a manner of connection between the conduits and the decompression housing at the lower parts of the conduits: FIG. 2(*a*) is a partially-fractured front view; and FIG. 2(*b*) is a cross-sectional diagram along line b-b in FIG. 2(*a*).

More specifically, the flange 58 includes an upper flange 58*a* and a lower flange 58*b* integrally provided at the lower portions of the ascending conduit 18 and the descending conduit 20 and sandwiching the electrode part 38 and the electrode part 42, which are each provided in a flanged shape, therebetween. Although the electrode part 38 and the electrode part 42 are integrated, the electrode part 38 and the electrode part 42 may be electrically separated by, e.g., interposing an insulator therebetween. The upper flange 58*a* is connected to a lower end of the decompression housing 22 via, e.g., bolts, is placed on the upper side of the electrode part 38 and the electrode part 42. The lower flange 58*b* is inserted from the lower ends of the ascending conduit 18 and the descending conduit 20, and placed on the lower side of the electrode part 38 and the electrode part 42. Each of the upper flange 58*a* and the lower flange 58*b* is a ring-shaped member formed of, for example, a metal such as stainless steel, and includes a heat insulating material 46 inside.

As described above, the upper flange 58*a* and the lower flange 58*b* sandwich the electrode part 38 and the electrode part 42 on the upper and lower sides, and these components are integrally connected via, e.g., bolts. Packing 80 for ensuring airtightness and electrical insulation is provided between the upper flange 58*a* and the electrode parts 38 and the electrode parts 42, and between the lower flange 58*b* and the electrode parts 38 and 42, respectively. Furthermore, an O-ring 90 for ensuring airtightness is provided between the decompression housing 22 and the upper flange 58*a*. As described above, the airtightness is retained between the lower parts of the ascending conduit 18 and the descending conduit 20 and the decompression housing 22 by the electrode part 38 and electrode part 42 sandwiched by the upper flange 58*a* and the lower flange 58*b* in an airtight manner.

Here, the electrode part 38 and the electrode part 42 are heated by direct current application, and thus, the electrode part 38 and the electrode part 42 themselves have a high temperature. Accordingly, the temperature of the connection part becomes 300° C. or higher, which is equal to or exceeds the heatproof temperatures of the O-ring 90 and the packing 80, and may result in impossibility to retain the airtightness. Therefore, as illustrated in FIG. 2, each of the upper flange 58*a* and the lower flange 58*b* is provided with the water-cooled tube 74. In the present embodiment, the water-cooled tube 74 is formed by hollowing out a flesh part of each of the upper flange 58*a* and the lower flange 58*b*.

However, water-cooling cools the ascending conduit 18 and the descending conduit 20, which leads to a decrease in temperature of molten glass flowing in the ascending conduit 18 and the descending conduit 20, and thus, the water-cooled tubes 74 should be positioned as far away from the ascending conduit 18 and the descending conduit 20 as possible. However, positioning the water-cooled tubes 74 far away from the ascending conduit 18 and the descending conduit 20 results in an increase in size of the decompression housing 22, and thus, the design should be made so that the distances from the ascending conduit 18 and the descending conduit 20 are around 90 to 200 mm. Furthermore, each water-cooled tube 74 desirably has a circular cross sectional shape, but may have a rectangular cross-sectional shape in consideration of workability.

Furthermore, in order to uniformly cool the O-ring 90 and the packing 80, the water-cooled tubes 74 are desirably arranged in a circle. Furthermore, the water-cooled tubes 74 are provided immediately above and below the packing 80, enabling efficient cooling.

Preferably, at least an inner surface of each of the first glass-melting tank 12, the second glass-melting tank 14, the third glass-melting tank 16, the ascending conduit 18 and the descending conduit 20 is formed of platinum or a platinum alloy. Although the above description has been provided so as to indicate that the first glass-melting tank 12, the second glass-melting tank 14, the third glass-melting tank 16, the ascending conduit 18 and the descending conduit 20 are formed of platinum or a platinum alloy from the perspective of current application for heating, from the perspective of prevention of foreign substance contamination, at least such inner surfaces are formed of platinum or a platinum alloy, enabling minimization of foreign substance contamination due to deterioration in the interface between the respective component and molten glass, which may occur when forming such component using insulating firebricks.

Next, a method for producing glass fibers using the above-described glass-melting device 10 will be described.

First, for starting operation of the glass-melting device 10, a glass fiber production startup process for preparing the production of a glass fiber is performed prior to a glass fiber production process for producing glass fibers.

In the glass fiber production startup process, first, glass raw materials such as glass powder, molten glass and glass gob are put into the first glass-melting tank 12, the second glass-melting tank 14 and the third glass-melting tank 16. The glass powder includes a powder mixture of, e.g., clay, limestone, dolomite, colemanite, silica sand, alumina, calcium carbonate and/or sodium carbonate. The molten glass is one resulting from such mixture being melted in advance before being put into the tanks. The glass gob is one resulting from the molten glass being temporarily cooled and solidified.

Next, the first glass-melting tank 12, the second glass-melting tank 14 and the third glass-melting tank 16 are heated so that the glass raw materials put therein are melted. Here, the ascending conduit 18 and the descending conduit 20 are also heated. Then, the glass raw materials put in the first glass-melting tank 12, the second glass-melting tank 14 and the third glass-melting tank 16 are melted to occlude the lower end parts of the ascending conduit 18 and the descending conduit 20 with the molten glass. Subsequently, the pressure inside the decompression housing 22 is reduced by the sucking device 48 so that the air pressure inside the decompression housing 22 becomes lower than an atmospheric pressure by 0.4 to 0.9 atmospheres. Consequently, the pressure reduction in the decompression housing 22 raises the liquid surfaces of the molten glass inside the ascending conduit 18 and the descending conduit 20, and the insides of the ascending conduit 18 and the descending conduit 20 are thereby filled with the molten glass.

Furthermore, the first glass-melting tank 12, the second glass-melting tank 14, the third glass-melting tank 16, the ascending conduit 18, the descending conduit 20 and the bushing 24 are separately heated to adjust the respective regions to have respective specified temperatures. The respective temperatures are properly set in the range of, for example, 1200 to 1500° C. for the second glass-melting tank 14, the ascending conduit 18, the first glass-melting tank 12, the descending conduit 20, the third glass-melting tank 16 and the bushing 24.

Furthermore, the gas inside the decompression housing 22 is sucked by the sucking device 48 to adjust the inside of the decompression housing 22 so as to have a predetermined reduced-pressure atmosphere. The air pressure inside the decompression housing 22 is reduced so as to be lower than an atmospheric pressure by 0.4 to 0.9 atmospheres.

Then, the molten glass is drawn out from the nozzles 24a of the bushing 24, introduced into the first glass-melting tank 12 from the second glass-melting tank 14 through the ascending conduit 18, and further introduced from the first glass-melting tank 12 into the third glass-melting tank 16 through the descending conduit 20. In the glass fiber production startup process, the molten glass may simply be discharged from the nozzles 24a without drawing the molten glass out of the nozzles 24a of the bushing 24.

Then, upon the glass-melting device 10 reaching the specified temperatures and air pressures, the glass fiber production startup process is finished and the glass fiber production process is started.

In the glass fiber production process, an amount of glass raw materials that corresponds to the amount of molten glass spun via the bushing 24 is put into the second glass-melting tank 14 so that the levels of the liquid surfaces of the molten glass in the first glass-melting tank 12, the second glass-melting tank 14 and the third glass-melting tank 16 are substantially constant. Then, the second glass-melting tank 14 is heated so that the temperature of the resulting molten glass becomes 1350 to 1550° C., thereby melting the glass raw materials.

Furthermore, the decompression housing 22 is made to enter a pressure-reduced state by the sucking device 48 so that the air pressure inside the decompression housing 22 becomes lower than an atmospheric pressure by 0.4 to 0.9 atmospheres.

Furthermore, the first glass-melting tank 12, the second glass-melting tank 14, the third glass-melting tank 16, the ascending conduit 18, the descending conduit 20 and the bushing 24 are separately heated. Their respective temperatures are properly set in the range of, for example, 1350 to 1550° C. for the second glass-melting tank 14, 1300 to 1500° C. for the ascending conduit 18, 1300 to 1500° C. for the first glass-melting tank 12, 1250 to 1450° C. for the descending conduit 20, 1250 to 1450° C. for the third glass-melting tank 16 and 1200 to 1400° C. for the bushing 24.

It is preferable that the glass raw materials be melted, and clarified to a certain degree in the second glass-melting tank 14. Also, it is preferable that the temperature of the molten glass in the third glass-melting tank 16 be controlled so as to be lower than the temperature of the molten glass in each of the first glass-melting tank 12 and the second glass-melting tank 14. Consequently, generation of bubbles by reboiling can be suppressed.

Then, molten glass is introduced into the first glass-melting tank 12 from the second glass-melting tank 14 through the ascending conduit 18, and the molten glass is exposed to a reduced-pressure atmosphere in the first glass-melting tank 12 to defoam the molten glass. Subsequently, the molten glass is introduced into the third glass-melting tank 16 from the first glass-melting tank 12 through the descending conduit 20. Then, the molten glass is wound under high tension from the nozzles 24a of the bushing 24 by a non-illustrated winder to spin the molten glass into a fiber. The flow rate of ejection of the molten glass from a nozzle 24a is, for example, 0.05 to 5.0 g/minute.

Here, the liquid surface of the molten glass in the first glass-melting tank 12 is made to be higher than that of each of the second glass-melting tank 14 and the third glass-melting tank 16 by 150 cm or more, more preferably, 230 to 460 cm and most preferably among them, 250 cm or more. Consequently, the air pressure in the first glass-melting tank 12 can be made to be lower than an atmospheric pressure by around 0.4 to 0.9 atmospheres. Then, under this degree of reduced-pressure atmosphere, the gas in the molten glass continuously diffuses in the existing bubbles, and the diameters of the bubbles thereby rapidly increase, enabling provision of a large defoaming effect.

Furthermore, the amount of suction by the sucking device 48 is controlled so that the reduced-pressure atmosphere to which the first glass-melting tank 12 is exposed, that is, the pressure difference (air pressure difference) between the air pressure inside the decompression housing 22 and the atmospheric pressure becomes constant. Consequently, fluctuations in the liquid surface of the molten glass due to minute fluctuations in the atmospheric pressure can be suppressed.

Furthermore, the amount of glass raw materials put into the second glass-melting tank 14 is controlled based on the level of the liquid surface of the molten glass in the third glass-melting tank 16 so that the level becomes constant.

Furthermore, the area resulting from adding up the liquid surface of the molten glass in the second glass-melting tank 14 and the liquid surface of the molten glass in the third glass-melting tank 16 is made to be ten times or more the area of the liquid surface of the molten glass in the first glass-melting tank 12. In other words, the areas of the liquid surfaces of the molten glass in the respective glass-melting tanks are made to meet expression (1) below, more preferably at least any one of expressions (2) and (3) below.

$$(S2+S3) \geq S1 \times 10 \tag{1}$$

$$S2 \geq S1 \times 10 \tag{2}$$

$$S1 \times 50 \geq S3/N \geq S1 \times 0.5 \tag{3}$$

Here,

S1 is the area (cm$^2$) of the liquid surface of the molten glass in the first glass-melting tank 12;

S2 is the area (cm$^2$) of the liquid surface of the molten glass in the second glass-melting tank 14;

S3 is the area (cm$^2$) of the liquid surface of the molten glass in the third glass-melting tank 16; and N is the number of bushings 24 (pieces) provided at the bottom part of the glass-melting tank 16.

If expression (1) is met, fluctuations in the level of the liquid surface of the molten glass in the third glass-melting tank 16 become fewer, enabling suppression of generation of bubbles brought from the surface of contact between the wall surface of the third glass-melting tank 16 and the molten glass, and fluctuations in the thickness of the spun glass fiber are thereby suppressed, enabling suppression of variation in strength and electric characteristics of molded products due to fluctuations in glass fiber count. In addition, the first glass-melting tank 12 can be downsized. Furthermore, if expression (2) is met, a certain degree of clarification is performed in the second glass-melting tank 14, enabling efficient removal of bubbles from the molten glass. Furthermore, if expression (3) is met, generation of bubbles in the third glass-melting tank can be suppressed, enabling sufficient suppression of generation of bubbles in the glass fiber.

As described in detail above, when the glass-melting device 10 according to the present embodiment is made to enter an operating state in which the ascending conduit 18 and the descending conduit 20 are filled with molten glass, molten glass melted in the second glass-melting tank 14 ascends in the ascending conduit 18 by the siphon principle to be introduced into the first glass-melting tank 12, and descends in the descending conduit 20 to be introduced into the third glass-melting tank 16, and spun into a glass fiber via the bushing 24. Consequently, the levels of the liquid surfaces of the molten glass in the second glass-melting tank 14 and the third glass-melting tank 16 become the same, and thus, even if fluctuations in liquid level occur in the first glass-melting tank 12 due to, e.g., fluctuations in air pressure of the atmosphere in the first glass-melting tank 12, liquid level fluctuations in the third glass-melting tank 16 from which a glass fiber is spun via the bushing 24 can be suppressed. Consequently, generation of bubbles brought from the surface of contact between the wall surface of the third glass-melting tank 16 and the molten glass can be suppressed, enabling effective reduction of mixing of bubbles into the spun glass fiber.

Furthermore, the glass raw materials can be introduced into the second glass-melting tank 14 exposed to an atmospheric-pressure atmosphere, enabling easy adjustment of the liquid level of the molten glass, which varies as a result of a glass fiber being spun via the bushing 24. In addition, the first glass-melting tank 12 can be made airtight, enabling suppression of air pressure fluctuations in the atmosphere in the first glass-melting tank 12. Consequently, fluctuations in liquid level of the third glass-melting tank 16 can further be suppressed.

Furthermore, glass raw materials are melted and a certain degree of clarification is performed in the second glass-melting tank 14, enabling reduction in size of the first glass-melting tank 12 exposed to a reduced-pressure atmosphere, and thus, even if liquid level fluctuations occur in the first glass-melting tank 12, liquid level fluctuations in the third glass-melting tank 16 can further be suppressed. In addition, for reduction of bubbles in a glass fiber, it is preferable that the first glass-melting tank 12 be arranged near the bushing 24 from which the molten glass is spun, that is, the third glass-melting tank 16, and such arrangement can easily be made by reduction in size of the first glass-melting tank 12.

In order to expose the first glass-melting tank 12 to a reduced-pressure atmosphere, it is necessary that the first glass-melting tank 12 have a predetermined level difference from the second glass-melting tank 14 and the third glass-melting tank 16, and thus, the ascending conduit 18 and the descending conduit 20 necessarily have a long length. Meanwhile, since an amount of glass spun per unit time is extremely small, and thus, a long time is required for molten glass to pass through the ascending conduit 18 and the descending conduit 20. Thus, the ascending conduit 18 and the descending conduit 20 are heated, and covered by the decompression housing 22, enabling the molten glass introduced into the ascending conduit 18 and the descending conduit 20 to be prevented from being solidified because of a temperature decrease. In addition, since the decompression housing 22 integrally covers the ascending conduit 18 and the descending conduit 20, the structure of the decompression housing 22 can be simplified, enabling effective heating and temperature maintenance of the ascending conduit 18 and the descending conduit 20.

Furthermore, the first glass-melting tank 12, the second glass-melting tank 14, the third glass-melting tank 16, the ascending conduit 18 and the descending conduit 20 are separately heated by the respective heating means, optimum temperature conditions can be provided for the respective regions, and thus, generation of bubbles from the molten glass due to reboiling can be suppressed.

Furthermore, the pressure inside the decompression housing 22 is reduced, making buckling of the ascending conduit 18 and the descending conduit 20 due to the pressure decrease difficult to occur, and therefore, the thicknesses of the walls of the ascending conduit 18 and the descending conduit 20 can be reduced. Consequently, the cost can be reduced in particular, for example, when the ascending conduit 18 and the descending conduit 20 are manufactured from an expensive material such as platinum.

Furthermore, current is supplied to the electrode parts 38 and the electrode parts 42 provided on the upper wall surfaces and the lower wall surfaces of the ascending conduit 18 and the descending conduit 20 to heat the electrode parts 38 and the electrode parts 42, enabling the ascending conduit 18 and the descending conduit 20 to be heated in their entireties. Consequently, proper heating and temperature maintenance of the molten glass introduced into the ascending conduit 18 and the descending conduit 20 can be performed.

Second Embodiment

Next, a second embodiment will be described with reference to FIGS. 3 to 5. A glass-melting device 110 for producing glass fibers according to a second embodiment has a configuration that is basically the same as that of the glass-melting device 10 for producing glass fibers according to the first embodiment. The glass-melting device 110 for producing glass fibers is different from the glass-melting device 10 for producing glass fibers according to the first embodiment only in that: an ascending conduit and a descending conduit are composed of one double tube; and partition plates are provided to a first glass-melting tank 12. Thus, a description will be provided below only for points of difference from the first embodiment, and a description of points that are the same as those of the first embodiment will be omitted.

Figure 3:
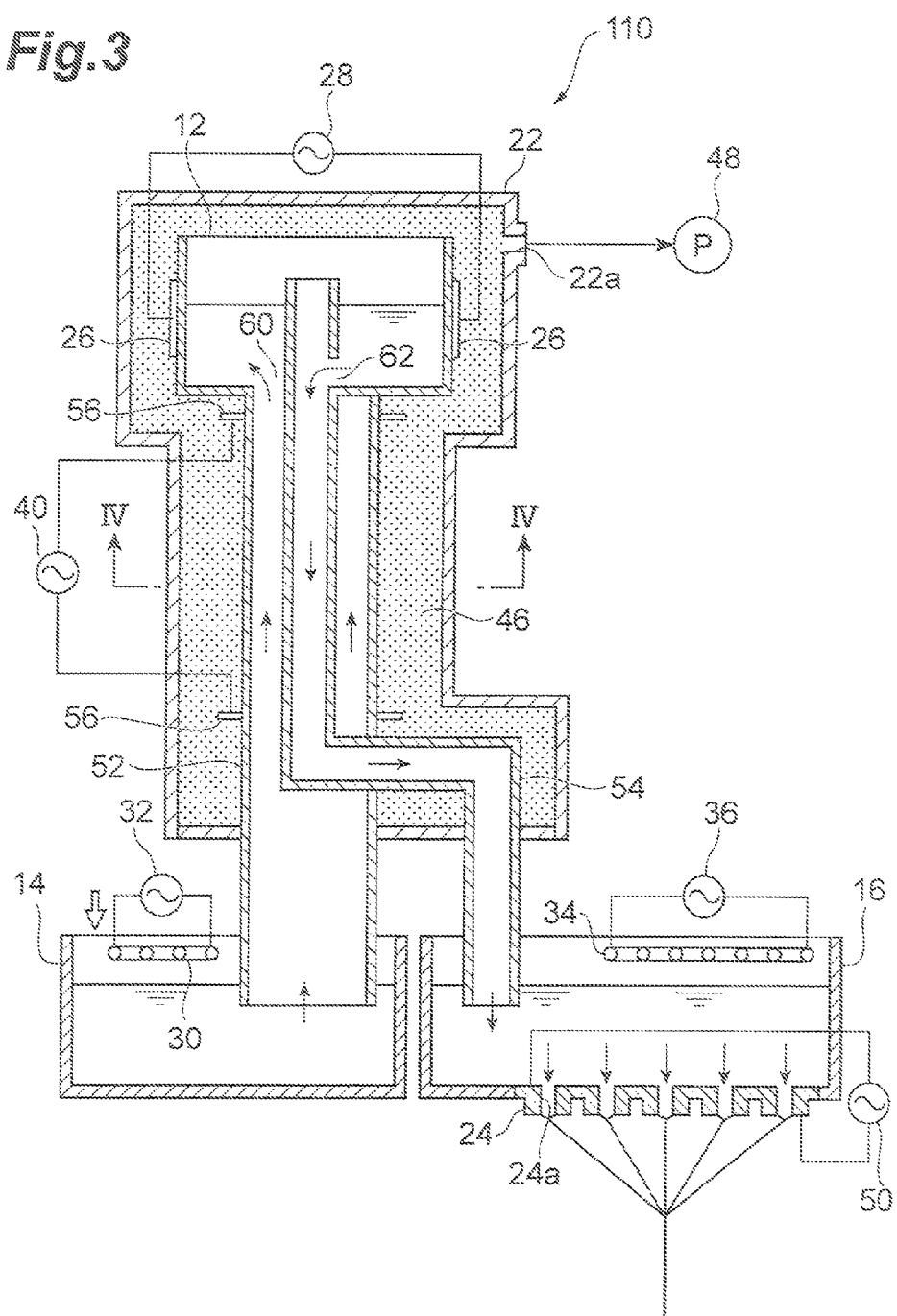
FIG. 3 is a cross-sectional diagram showing a configuration of glass-melting device for producing glass fibers according to a second embodiment.

FIG. 3 is a cross-sectional diagram showing a configuration of a glass-melting device for producing glass fibers according to a second embodiment. FIG. 4 is a cross-sectional diagram along line IV-IV in FIG. 3. FIG. 5 is a transparent perspective diagram showing a first glass-melting tank in FIG. 3 in detail.

As illustrated in FIG. 3, the glass-melting device 110 for producing glass fibers includes a first glass-melting tank 12, a second glass-melting tank 14, a third glass-melting tank 16, an ascending conduit part 52, a descending conduit part 54, a decompression housing 22 and a bushing 24.

The ascending conduit part 52 sends up molten glass resulting from melting in the second glass-melting tank 14 to deliver the molten glass to the first glass-melting tank 12, and extends downward from the first glass-melting tank 12 to the second glass-melting tank 14.

The descending conduit part 54 sends the molten glass down from the first glass-melting tank 12 to deliver the molten glass to the third glass-melting tank 16, and extends downward from the first glass-melting tank 12 to the third glass-melting tank 16. Furthermore, an upper end of the descending conduit part 54 penetrates the first glass-melting tank 12 and projects to a position higher than the liquid surface of molten glass in the first glass-melting tank 12.

Figure 4:
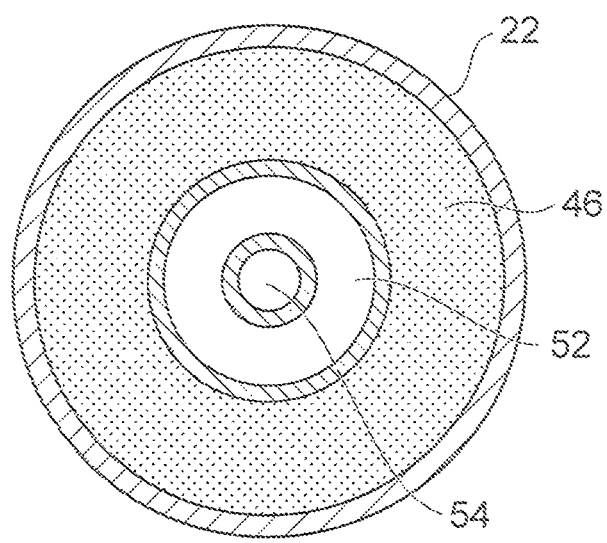
FIG. 4 is a cross-sectional diagram along line IV-IV indicated in FIG. 3.

Then, as illustrated in FIGS. 3 and 4, the ascending conduit part 52 and the descending conduit part 54 are included in a double-tube structure in which the ascending conduit part 52 is arranged on the outer side while the descending conduit part 54 being arranged on the inner side, and thereby integrally formed. The ascending conduit part 52 and the descending conduit part 54 are each formed in an elongated cylindrical shape. The ascending conduit part 52 and the descending conduit part 54 integrally extend downward from the first glass-melting tank 12 in the state of the double-tube structure, and at lower end parts of the ascending conduit part 52 and the descending conduit part 54, the descending conduit part 54 protrudes to the outside of the ascending conduit part 52, thereby the ascending conduit part 52 and the descending conduit part 54 being separated from each other.

Also, the ascending conduit part 52 includes an inflow communication hole 60, which is in communication with the first glass-melting tank 12, at an upper end part thereof, and the descending conduit part 54 includes an outflow communication hole 62, which is in communication with the first glass-melting tank 12, at the upper end part thereof. Thus, the molten glass that has ascended in the ascending conduit part 52 flows into the first glass-melting tank 12 via the inflow communication hole 60, and the molten glass introduced into the first glass-melting tank 12 flows out to the descending conduit part 54 via the outflow communication hole 62.

The ascending conduit part 52 and the descending conduit part 54 include heating means for heating the molten glass. The heating means includes a pair of flanged electrode parts 56 provided on an upper wall surface and a lower wall surface of the ascending conduit part 52, and a power supply 40 that supplies current to the electrode parts 56. The heating means applies current to the ascending conduit part 52 via the electrode part 56 to make the ascending conduit part 52 heat itself. The descending conduit part 54 is heated indirectly by the molten glass heated by the self-heating of the ascending conduit part 52, and heats itself upon current being applied thereto via a joint part between the descending conduit part 54 and the ascending conduit part 52. Accordingly, the ascending conduit part 52 and the descending conduit part 54 each are formed of a material that generates heat upon current being applied thereto, for example, platinum or a platinum alloy. The electrode part 56 may be provided on a wall surface of the first glass-melting tank 12 instead of the upper wall surface of the ascending conduit part 52. In this case, it is preferable that the electrode part 56 be provided on a bottom part, or a lower part of a side part, of the first glass-melting tank 12 so as not to be an obstacle to the heating means of the first glass-melting tank 12.

Figure 5:
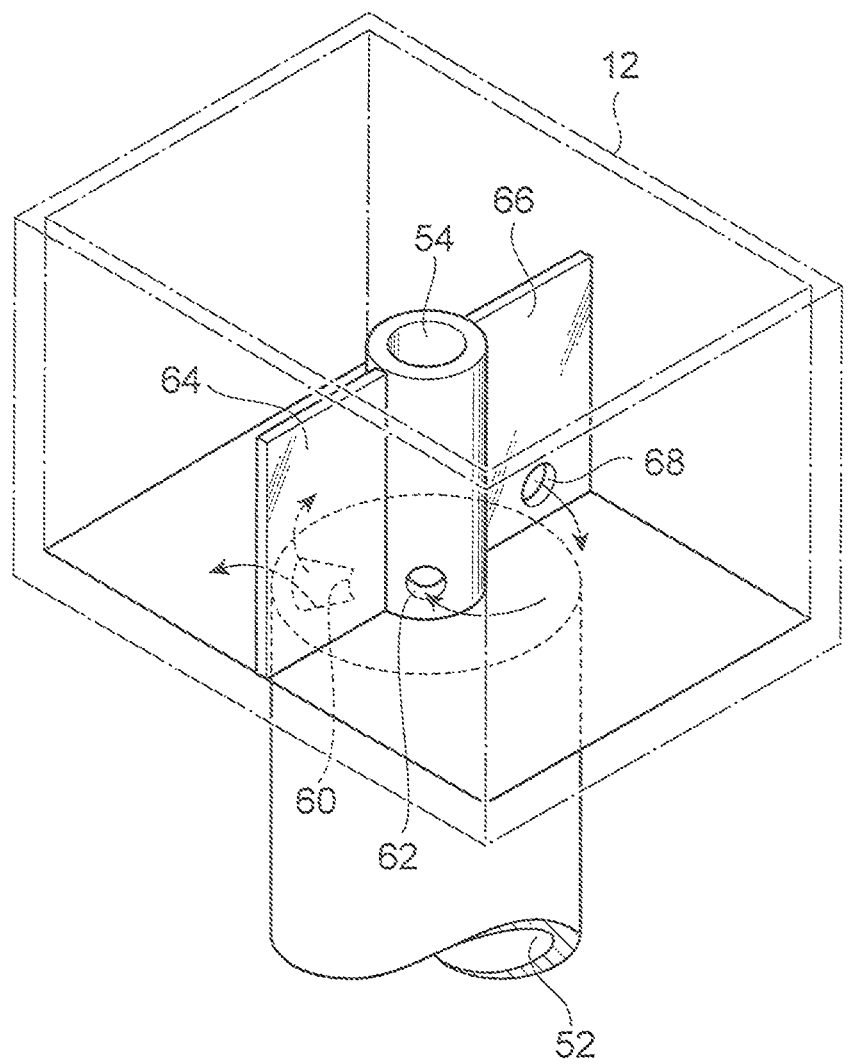
FIG. 5 is a transparent perspective diagram showing the first glass-melting tank in FIG. 3 in detail.

As illustrated in FIG. 5, the first glass-melting tank 12 is provided with a partition plate 64 and an upper partition plate 66.

The partition plate 64 and the upper partition plate 66 are each connected to the descending conduit part 54 projecting inside the first glass-melting tank 12 and respective wall surfaces of the first glass-melting tank 12, to divide the inside of the first glass-melting tank 12 into a region provided with the inflow communication hole 60 and a region provided with the outflow communication hole 62.

The partition plate 64 is arranged at a position closer to the inflow communication hole 60 and the outflow communication hole 62 compared to the upper partition plate 66, and blocks transfer of molten glass. Thus, the partition plate 64 is provided so as to stand from a bottom surface of the first glass-melting tank 12 to a position higher than the liquid surface of the molten glass.

The upper partition plate 66 is arranged at a position farther from the inflow communication hole 60 and the outflow communication hole 62 compared to the partition plate 64, and blocks molten glass from passing around the liquid surface and allows molten glass to pass around the bottom surface only. Thus, the upper partition plate 66 is provided so as to stand from the bottom surface of the first glass-melting tank 12 to a position higher than the liquid level of the molten glass, and a through hole 68 is formed in the vicinity of the bottom surface of the first glass-melting tank 12.

Next, a method for producing glass fibers using the above-described glass-melting device 110 will be described with reference to FIG. 6 as well. FIG. 6 includes diagrams showing a flow of molten glass in the first glass-melting tank.

First, in a glass fiber production startup process, glass raw materials are put into the first glass-melting tank 12, the second glass-melting tank 14 and the third glass-melting tank 16. Then, the first glass-melting tank 12, the second glass-melting tank 14, the third glass-melting tank 16 and the ascending conduit part 52 are heated to melt glass raw material, and the lower end parts of the ascending conduit part 52 and the descending conduit part 54 are occluded by the melted glass, and then the pressure inside the decompression housing 22 is reduced by a sucking device 48 to raise the liquid surfaces of the molten glass in the ascending conduit part 52 and the descending conduit part 54, thereby the insides of the ascending conduit part 52 and the descending conduit part 54 being filled with the molten glass.

Furthermore, the first glass-melting tank 12, the second glass-melting tank 14, the third glass-melting tank 16, the ascending conduit part 52 and the bushing 24 are separately heated to adjust the respective regions to respective specified temperatures. The respective temperatures may properly be set as in the above-described first embodiment.

Furthermore, a gas inside the decompression housing 22 is sucked by the sucking device 48 to adjust the inside of the decompression housing 22 to have a predetermined reduced-pressure atmosphere. The air pressure inside the decompression housing 22 is made to be lower than an atmospheric pressure by 0.4 to 0.9 atmospheres.

Then, the molten glass is drawn out from nozzles 24a of the bushing 24, introduced from the second glass-melting tank 14 into the first glass-melting tank 12 through the ascending conduit 18, and further introduced from the first glass-melting tank 12 into the third glass-melting tank 16 through the descending conduit 20. In the glass fiber production startup process, the molten glass may simply be discharged from the nozzles 24a of the bushing 24 without drawing the molten glass out of the nozzles 24a.

Then, upon the glass-melting device 110 reaching the specified temperatures and air pressures, the glass fiber production startup process is finished and a glass fiber production process is started.

In the glass fiber production process, as in the first embodiment, glass raw materials are put into the second glass-melting tank 14. Then, the second glass-melting tank 14 is heated so that the temperature of the resulting molten glass becomes 1350 to 1550° C., thereby melting the glass raw materials. Also, a gas inside the decompression housing 22 is sucked by the sucking device 48 to create a pressure-reduced state inside the decompression housing 22 so that the air pressure in the decompression housing 22 is lower than an atmospheric pressure by 0.4 to 0.9 atmospheres.

Furthermore, the first glass-melting tank 12, the second glass-melting tank 14, the third glass-melting tank 16, the ascending conduit part 52, the descending conduit part 54 and the bushing 24 are separately heated. Their respective temperatures are set as in the above-described first embodiment.

For the ascending conduit part 52 and the descending conduit part 54 included in the double-tube structure, only the ascending conduit part 52 is heated while the descending conduit part 54 being indirectly heated as a result of the ascending conduit part 52 being heated, enabling the temperature of the descending conduit part 54 to be lower than the temperature of the ascending conduit part 52. Consequently, generation of bubbles due to reboiling can be suppressed.

Then, molten glass is introduced from the second glass-melting tank 14 into the first glass-melting tank 12 through the ascending conduit part 52, and the molten glass is exposed to a reduced-pressure atmosphere in the first glass-melting tank 12 to defoam the molten glass.

Here, as illustrated in FIG. 6, the molten glass flows into the first glass-melting tank 12 from the inflow communication hole 60, passes through the through hole 68 of the upper partition plate 66, which is far from the inflow communication hole 60, and then flows into the descending conduit part 54 from the outflow communication hole 62, which is far from the through hole 68. Here, bubbles removed from the molten glass due to the exposure to the reduced-pressure atmosphere ascend toward the liquid surface, but are blocked from passing in the vicinity of the liquid surface of the molten glass by the upper partition plate 66. Thus, it is possible to effectively suppress bubbles removed from the molten glass as a result of the defoaming from being led to the descending conduit part 54 via the outflow communication hole 62.

Subsequently, the molten glass is introduced from the first glass-melting tank 12 into the third glass-melting tank 16 through the descending conduit part 54, and the molten glass is wound under high tension from the nozzles 24a of the bushing 24 by a non-illustrated winder to spin the molten glass into a fiber.

As described in detail above, in the glass-melting device 110 according to the present embodiment, the ascending conduit part 52 and the descending conduit part 54 are included in a double-tube structure, and thus, when the ascending conduit part 52 is heated, the descending conduit part 54 is indirectly heated by, e.g., the heat radiated by the heating. Consequently, the ascending conduit part 52 and the descending conduit part 54 can efficiently be heated. In addition, there is almost no pressure difference between the inside and the outside of the descending conduit part 54, enabling reduction in thickness of the wall thereof.

Furthermore, as a result of the partition plate 64 and the upper partition plate 66 being provided, the molten glass flowing in from the inflow communication hole 60 flows out from the outflow communication hole 62 through the through hole 68 formed in the upper partition plate 66. Thus, the upper partition plate 66 can prevent bubbles floating as a result of being removed from the molten glass from going with the flow of the molten glass, enabling the bubbles to be prevented from flowing into the descending conduit part 54. Consequently, mixing of bubbles into a spun glass fiber can more efficiently be reduced.

Third Embodiment

Next, a third embodiment will be described with reference to FIG. 7. A glass-melting device 210 for producing glass fibers according to a third embodiment has a configuration that is basically the same as that of the glass-melting device 110 for producing glass fibers according to the second embodiment. The glass-melting device 210 for producing glass fibers is different from the glass-melting device 110 for producing glass fibers according to the second embodiment only in a configuration of a housing covering a first glass-melting tank 12, an ascending conduit part 52 and a descending conduit part 54. Thus, only points of the difference from the second embodiment will be described below, and a description of points that are the same as the second embodiment will be omitted.

Figure 7:
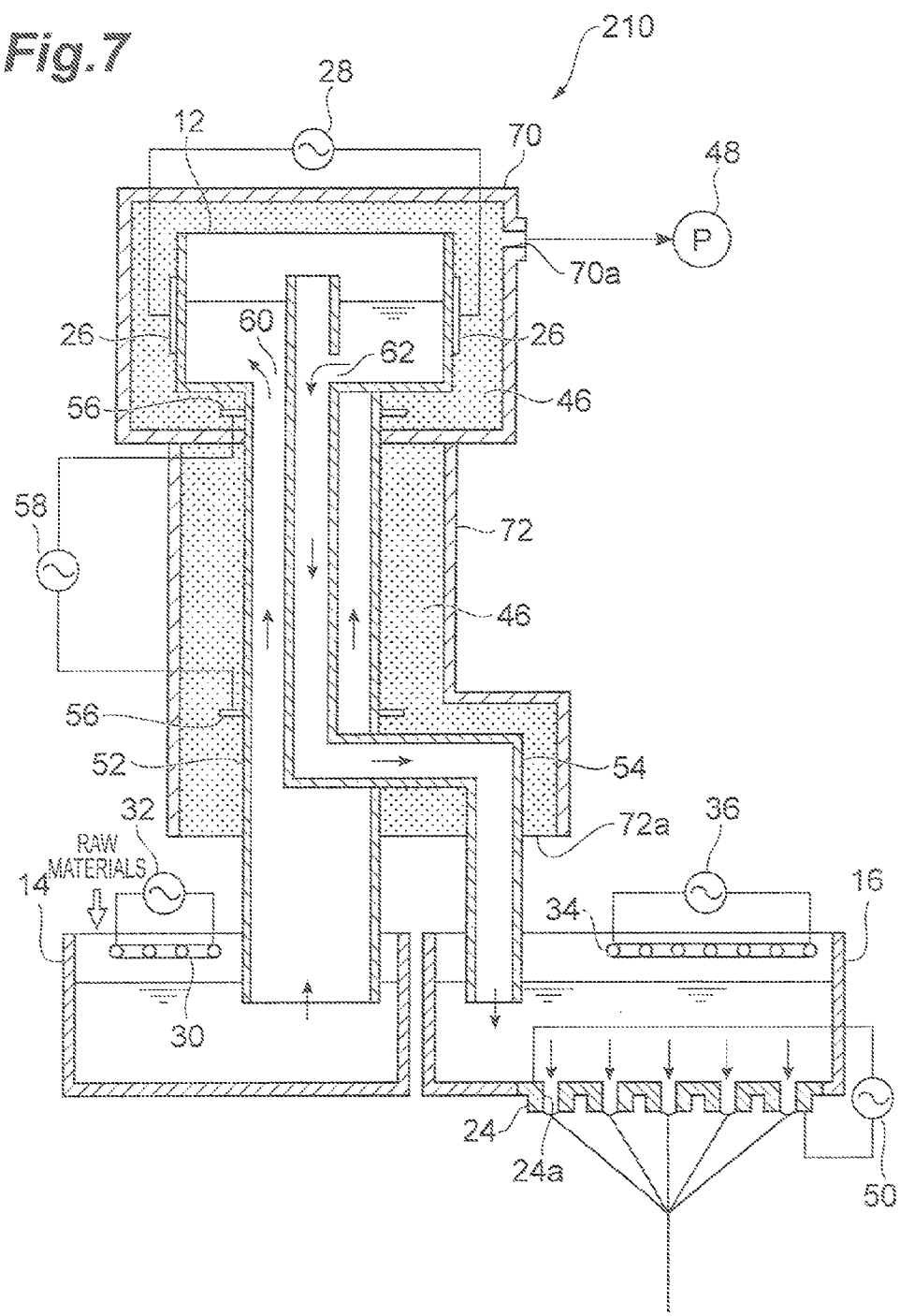
FIG. 7 is a cross-sectional diagram showing a configuration of a glass-melting device for producing glass fibers according to a third embodiment.

FIG. 7 is a cross-sectional diagram showing a configuration of a glass-melting device for producing glass fibers according to a third embodiment.

As illustrated in FIG. 7, the glass-melting device 210 for producing glass fibers includes a first glass-melting tank 12, a second glass-melting tank 14, a third glass-melting tank 16, an ascending conduit part 52, a descending conduit part 54, a decompression housing 70, a heat-insulating housing 72 and a bushing 24.

The decompression housing 70 exposes the first glass-melting tank 12 to a reduced-pressure atmosphere, and covers the first glass-melting tank 12 in an airtight manner. A material and structure of the decompression housing 70 are not specifically limited as long as such material and structure have airtightness and strength, and the decompression housing 70 is preferably formed of a metal material such as stainless steel.

A heat insulating material 46 for heat-insulation efficiency enhancement is accommodated in a space between the decompression housing 70 and the first glass-melting tank 12.

A side wall of the decompression housing 70 is provided with a suction opening 70a for pressure reduction, which is connected to a sucking device 48.

The heat-insulating housing 72 integrally covers the ascending conduit part 52 and the descending conduit part 54 in a state in which lower ends of the ascending conduit part 52 and the descending conduit part 54 project therefrom. A material and structure of the heat-insulating housing 72 are not specifically limited as long as such material and structure has strength, and the heat-insulating housing 72 is preferably formed of a metal material such stainless steel.

A heat insulating material 46 for heat-insulation efficiency enhancement is accommodated in a space between the heat-insulating housing 72, and the ascending conduit part 52 and the descending conduit part 54. A support portion (not illustrated) supporting the heat insulating material 46 is attached to a lower end 72a of the heat-insulating housing 72, and no specific structure for providing airtightness between the ascending conduit part 52 and the descending conduit part 54 is provided. Furthermore, no sucking device is connected to the heat-insulating housing 72. Thus, the inside of the heat-insulating housing 72 has a normal pressure (atmospheric pressure).

A method for producing glass fibers using the glass-melting device 210 for producing glass fibers is the same as that using the glass-melting device 110 for producing glass fibers according to the second embodiment.

As described in detail above, in the glass-melting device 210 according to the present embodiment, the ascending conduit part 52 and the descending conduit part 54 are integrally formed, enabling enhancement of the strength by properly setting the thicknesses of the walls of the ascending conduit part 52 and the descending conduit part 54, making buckling of the ascending conduit part 52 and the descending conduit part 54 difficult to occur. Consequently, there is no need to reduce the pressure inside the heat-insulating housing 72 covering the ascending conduit part 52 and the descending conduit part 54, enabling the inside of the heat-insulating housing 72 to have an atmospheric pressure, and thus, the need to provide strict sealing between the ascending conduit part 52 and the descending conduit part 54, and the heat-insulating housing 72 is eliminated. Consequently, there is no need to provide a specific expansion/contraction mechanism for absorbing the expansion/contraction difference between the ascending conduit part 52 and the descending conduit part 54, and the heat-insulating housing 72 due to thermal expansion, enabling a part of connection between the ascending conduit part 52 and the descending conduit part 54, and the heat-insulating housing 72 to have a simple configuration.

Fourth Embodiment

Next, a fourth embodiment will be described with reference to FIG. 8. The glass-melting device 310 for producing glass fibers according to the fourth embodiment has a configuration that is basically the same as the glass-melting device 210 for producing glass fibers according to the third embodiment. The glass-melting device 310 for producing glass fibers is different from the glass-melting device 210 for producing glass fibers according to the third embodiment only in that an ascending conduit part and a descending conduit part included in a double-tube structure are replaced with each other in terms of the inner side and the outer side. Thus, only points of difference from the third embodiment will be described below, and a description of points that are the same as those of the third embodiment will be omitted.

Figure 8:
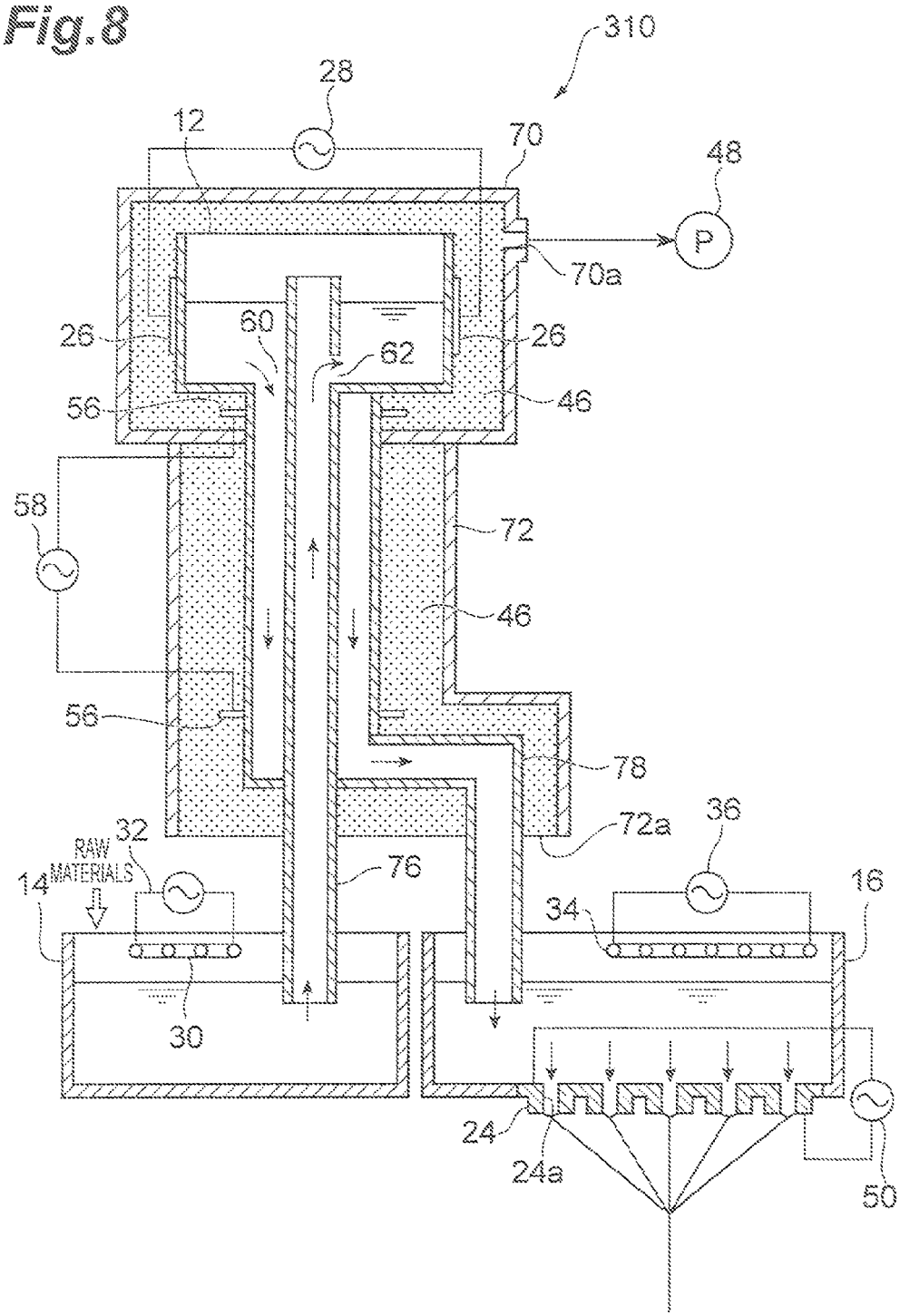
FIG. 8 is a cross-sectional diagram showing a configuration of a glass-melting device for producing glass fibers according to a fourth embodiment.

FIG. 8 is a cross-sectional diagram showing a configuration of a glass-melting device for producing glass fibers according to a fourth embodiment.

As illustrated in FIG. 8, the glass-melting device 310 for producing glass fibers includes a first glass-melting tank 12, a second glass-melting tank 14, a third glass-melting tank 16, an ascending conduit part 76, a descending conduit part 78, a decompression housing 70, a heat-insulating housing 72 and a bushing 24.

The ascending conduit part 76 sends up molten glass resulting from melting in the second glass-melting tank 14 to deliver the molten glass to the first glass-melting tank 12, and extends downward from the first glass-melting tank 12 to the second glass-melting tank 14. An upper end of the ascending conduit part 76 penetrates the first glass-melting tank 12, and projects to a position higher than the liquid surface of the molten glass in the first glass-melting tank 12.

The descending conduit part 78 sends the molten glass down from the first glass-melting tank 12 to deliver the molten glass to the third glass-melting tank 16, and extends downward from the first glass-melting tank 12 to the third glass-melting tank 16.

The ascending conduit part 76 and the descending conduit part 78 are formed of a double-tube structure in which the ascending conduit part 76 is arranged on the inner side while the descending conduit part 78 is arranged on the outer side, and thereby integrally formed. The ascending conduit part 76 and the descending conduit part 78 are each formed in an elongated cylindrical shape. The ascending conduit part 76 and the descending conduit part 78 integrally extend downward from the first glass-melting tank 12 in the state of the double-tube structure, and at lower end parts of the ascending conduit part 76 and the descending conduit part 78, the ascending conduit part 76 protrudes to the outside of the descending conduit part 78, thereby the ascending conduit part 76 and the descending conduit part 78 being separated from each other.

When producing glass fibers using the glass-melting device 310 for producing glass fibers, as in the third embodiment, molten glass is introduced from the second glass-melting tank 14 into the first glass-melting tank 12 through the ascending conduit part 76, and the molten glass is defoamed in the first glass-melting tank 12. Subsequently, the molten glass is introduced from the first glass-melting tank 12 into the third glass-melting tank 16 through the descending conduit part 78, and the molten glass is wound under high tension by a non-illustrated winder from nozzles 24a of the bushing 24 to spin the molten glass into a fiber.

As described above, even if the ascending conduit part 76 and the descending conduit part 78 included in the double-tube structure are replaced with each other in terms of the inner side and the outer side, a glass fiber with fewer bubbles mixed therein can be produced as in the third embodiment.

Fifth Embodiment

Next, a fifth embodiment will be described with reference to FIGS. 9 and 10. The glass-melting device 410 for producing glass fibers according to the fifth embodiment has a configuration that is basically the same as the glass-melting device 210 for producing glass fibers according to the third embodiment. The glass-melting device 410 for producing glass fibers is different from the glass-melting device 210 for producing glass fibers according to the third embodiment only in that the ascending conduit part and the descending conduit part have a configuration that is different from that of the third embodiment. Therefore, only points of difference from the third embodiment will be described, and points that are the same as the third embodiment will be omitted.

Figure 9:
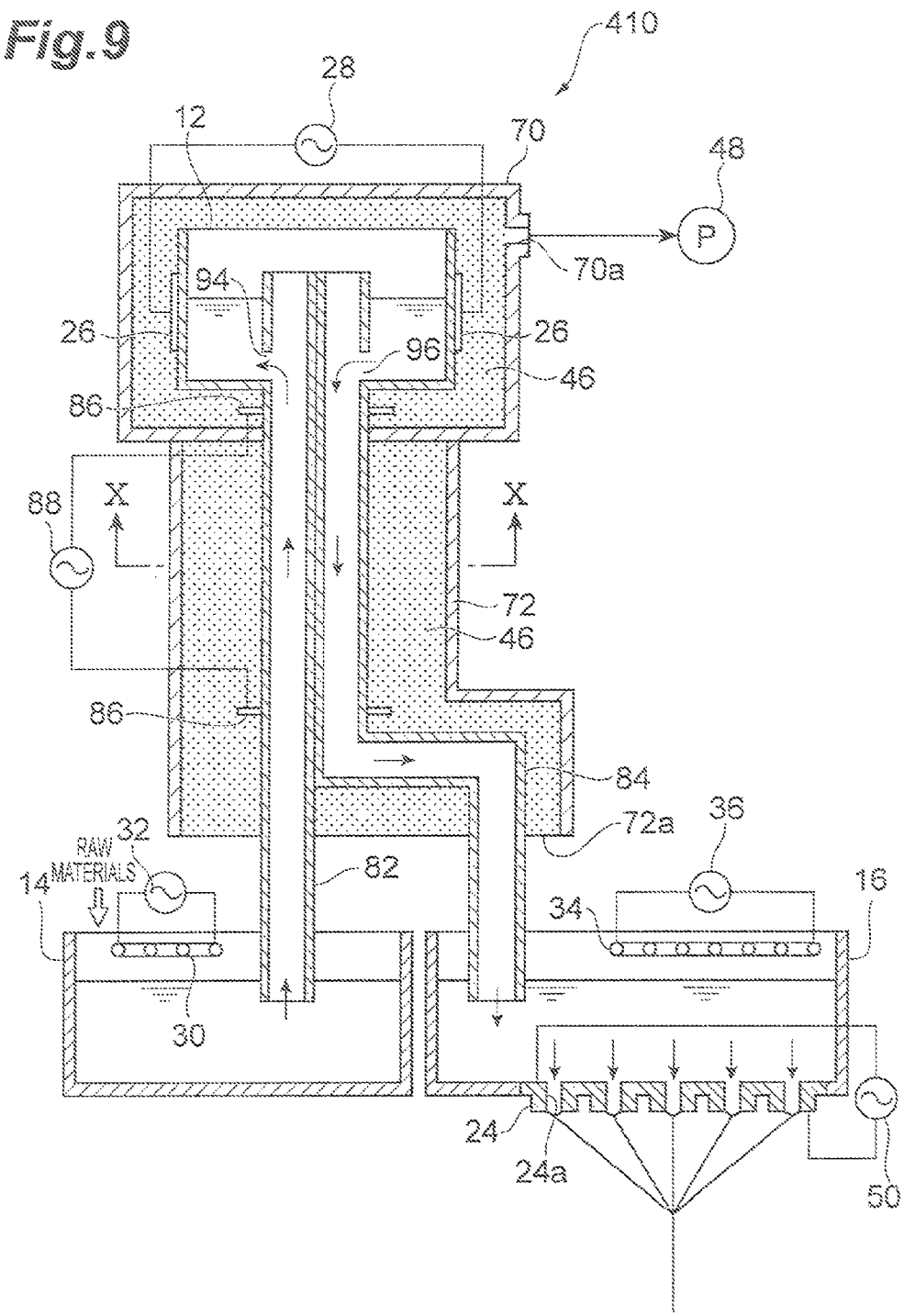
FIG. 9 is a cross-sectional diagram showing a configuration of a glass-melting device for producing glass fibers according to a fifth embodiment.

FIG. 9 is a cross-sectional diagram showing a configuration of a glass-melting device for producing glass fibers according to a fifth embodiment. FIG. 10 is a cross-sectional diagram along line X-X in FIG. 9.

As illustrated in FIG. 9, a glass-melting device 410 for producing glass fibers includes a first glass-melting tank 12, a second glass-melting tank 14, a third glass-melting tank 16, an ascending conduit part 82, a descending conduit part 84, a decompression housing 70, a heat-insulating housing 72 and a bushing 24.

The ascending conduit part 82 sends up molten glass resulting from melting in the second glass-melting tank 14 to deliver the molten glass to the first glass-melting tank 12, and is formed a semicylindrical shape extending downward from the first glass-melting tank 12 to the second glass-melting tank 14. Furthermore, an upper end of the ascending conduit part 82 penetrates the first glass-melting tank 12, and projects to a position higher than the liquid surface of the molten glass inside the first glass-melting tank 12.

The descending conduit part 84 sends the molten glass down from the first glass-melting tank 12 to deliver the molten glass to the third glass-melting tank 16, and is formed in a semicylindrical shape extending downward from the first glass-melting tank 12 to the third glass-melting tank 16. Furthermore, an upper end of the descending conduit part 84 penetrates the first glass-melting tank 12, and projects to a position higher than the liquid surface of the molten glass inside the first glass-melting tank 12.

Figure 10:
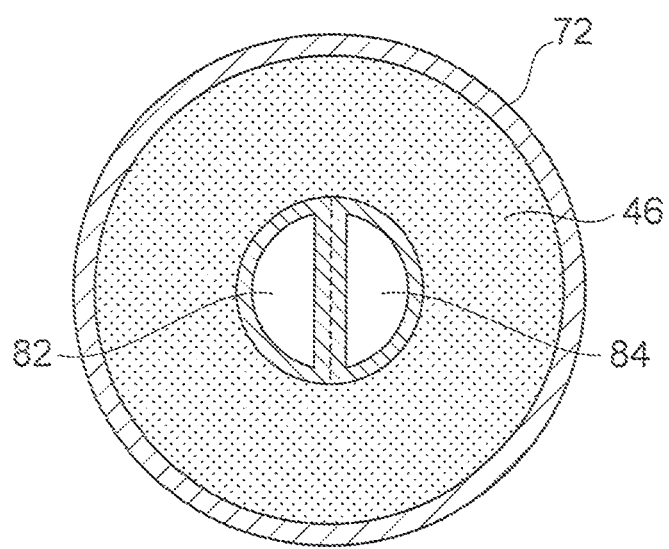
FIG. 10 is a cross-sectional diagram along line X-X indicated in FIG. 9.

As illustrated in FIGS. 9 and 10, the semicylindrical ascending conduit part 82 and the semicylindrical descending conduit part 84 are integrally joined to form one cylindrical conduit with a partition wall formed inside. In other words, the ascending conduit part 82 and the descending conduit part 84 are formed by a partition wall being formed inside one cylindrical conduit. The conduit including the ascending conduit part 82 and the descending conduit part 84 may be formed by joining semicylindrical conduits together, or providing a partition wall separating the ascending conduit part 82 and the descending conduit part 84 from each other inside a cylindrical conduit. The ascending conduit part 82 and the descending conduit part 84 integrally extend downward from the first glass-melting tank 12 in a joined state, and the ascending conduit part 82 and the descending conduit part 84 are separated from each other at lower end parts thereof.

Furthermore, at an upper end part of the ascending conduit part 82, an inflow communication hole 94 that is in communication with the first glass-melting tank 12 is formed, and an upper end part of the descending conduit part 84, an outflow communication hole 96 that is in communication with the first glass-melting tank 12 is formed. Thus, the molten glass that has ascended in the ascending conduit part 82 flows into the first glass-melting tank 12 via the inflow communication hole 94, and the molten glass introduced into the first glass-melting tank 12 flows out to the descending conduit part 84 via the outflow communication hole 96.

The ascending conduit part 82 and the descending conduit part 84 include heating means for heating the molten glass. The heating means includes a pair of flanged electrode parts 86 provided on an upper wall surface and a lower wall surface of the cylindrical conduit integrally including the ascending conduit part 82 and the descending conduit part 84, and a power supply 88 that supplies current to the electrode parts 86. The heating means applies current to the ascending conduit part 82 and the descending conduit part 84 via the electrode parts 86 to make the ascending conduit part 82 and the descending conduit part 84 heat themselves. Accordingly, the ascending conduit part 82 and the descending conduit part 84 each is formed of a material that generates heat upon current being applied thereto, for example, platinum or a platinum alloy. The electrode part 86 may be provided on a wall surface of the first glass-melting tank 12 instead of the upper wall surfaces of the ascending conduit part 82 and the descending conduit part 84. In this case, it is preferable that the electrode part 86 be provided on a bottom part, or a lower part of a side part, of the first glass-melting tank 12 so as not to be an obstacle to the heating means of the first glass-melting tank 12. For the heating means, separate electrodes may be provided to the ascending conduit part 82 and the descending conduit part 84 to separately apply current to the electrodes, thereby the ascending conduit part 82 and the descending conduit part 84 separately heat themselves.

Next, a method for producing glass fibers using the glass-melting device 410 will be described.

First, the first glass-melting tank 12, the second glass-melting tank 14, the third glass-melting tank 16, the ascending conduit part 82 and the descending conduit part 84 are heated, and the pressure inside the decompression housing 22 is reduced by a sucking device 48 to fill the insides of the ascending conduit part 82 and the descending conduit part 84 with molten glass.

Furthermore, the first glass-melting tank 12, the second glass-melting tank 14, the third glass-melting tank 16, the ascending conduit part 82, the descending conduit part 84 and the bushing 24 are separately heated to adjust the respective regions to specified temperatures. The respective temperatures may be set as in the first embodiment or the third embodiment.

A gas inside the decompression housing 22 is sucked by the sucking device 48 to adjust the inside of the decompression housing 22 to a predetermined reduced-pressure atmosphere. The air pressure inside the decompression housing 22 is made to be lower than an atmospheric pressure by 0.4 to 0.9 atmospheres.

Then, molten glass resulting from melting in the second glass-melting tank 14 is made to ascend from the second glass-melting tank 14 through the ascending conduit part 82, introduced from the inflow communication hole 94 into the first glass-melting tank 12, and deformed in the first glass-melting tank 12. Subsequently, the molten glass is made to descend from the outflow communication hole 96 through the descending conduit part 84 to be introduced into the third glass-melting tank 16. Then, the molten glass is wound under high tension by a non-illustrated winder from nozzles 24a of the bushing 24 and spun into a fiber.

As described in detail above, in the glass-melting device 410 according to the present embodiment, the ascending conduit part 82 and the descending conduit part 84 are integrally joined to each other, and thus, when the ascending conduit part 82 and the descending conduit part 84 are heated, the ascending conduit part 82 and the descending conduit part 84 thermally expand in a substantially same behavior. Thus, a failure due to an expansion/contraction difference between the ascending conduit part 82 and the descending conduit part 84 can be prevented.

In this case, a partition wall is formed inside one conduit to form the ascending conduit part 82 and the descending conduit part 84, enabling easy production of the ascending conduit part 82 and the descending conduit part 84. In addition, the conduit is reinforced by the partition wall inside the conduit, enabling reduction in thickness of the walls of the ascending conduit part 82 and the descending conduit part 84. In other words, where proper thicknesses of the walls of the ascending conduit part 82 and the descending conduit part 84 are set, occurrence of buckling of the conduit can be suppressed even under an atmospheric pressure without reducing the pressure inside the heat-insulating housing 72.

Sixth Embodiment

Next, a sixth embodiment will be described with reference to FIGS. 11 and 12. The glass-melting device 510 for producing glass fibers according to a sixth embodiment has a configuration that is basically the same as that of the glass-melting device 10 for producing glass fibers according to the first embodiment. The glass-melting device 510 for producing glass fibers is different from the glass-melting device 10 for producing glass fibers according to the first embodiment only in that partition plates are provided inside the first glass-melting tank 12. Thus, only points of difference from the first embodiment will be described, and points that are the same as the first embodiment will be omitted.

Figure 11:
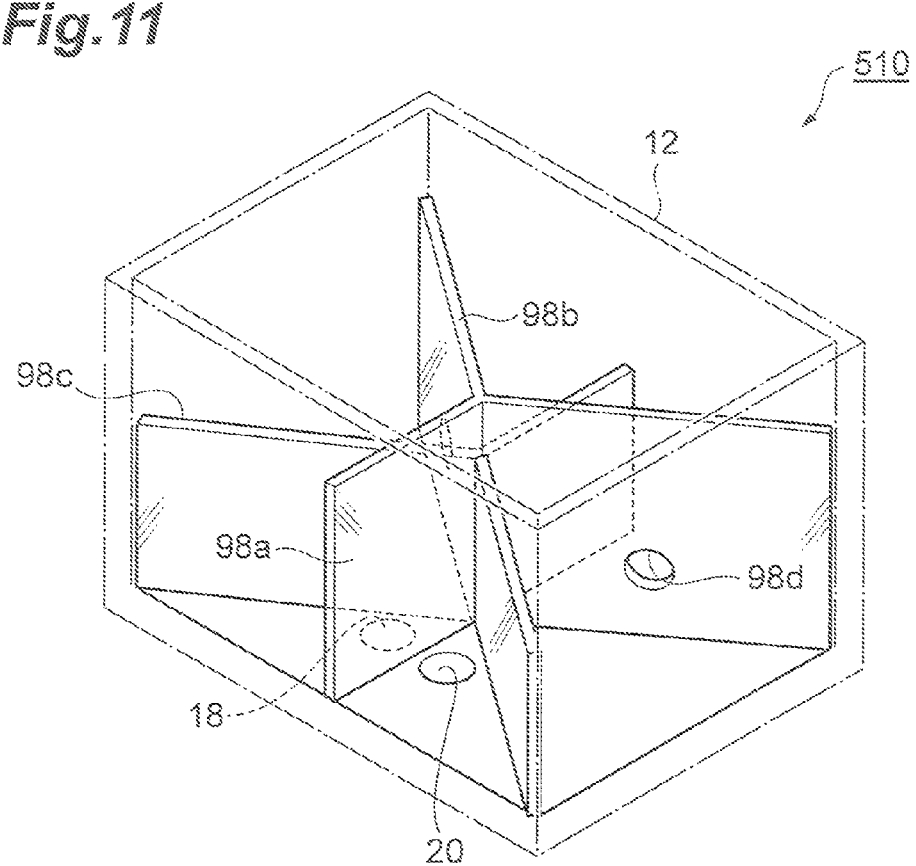
FIG. 11 is a cross-sectional diagram showing a configuration of a glass-melting device for producing glass fibers according to a sixth embodiment.

FIG. 11 is a cross-sectional diagram showing a configuration of a glass-melting device for producing glass fibers according to a sixth embodiment. FIG. 12 includes diagrams showing a flow of molten glass inside the first glass-melting tank.

As illustrated in FIG. 11, the first glass-melting tank 12 in the glass-melting device 510 for producing glass fibers includes one partition plate 98a, two upper partition plates 98b and three lower partition plates 98c.

The partition plate 98a blocks transfer of molten glass. Thus, the partition plate 98a is arranged between the ascending conduit 18 and the descending conduit 20. The partition plate 98a is provided so as to stand from a bottom surface of the first glass-melting tank 12 to a position higher than the liquid surface of the molten glass.

The upper partition plates 98b each block passage of molten glass in the vicinity of the liquid surface, and allow passage of the molten glass in the vicinity of the bottom surface only. The respective upper partition plate 98b are connected to the partition plate 98a, and the ascending conduit 18 and the descending conduit 20 are arranged between the upper partition plate 98b and the respective partition plates 98a. Each upper partition plate 98b is provided so as to stand from the bottom surface of the first glass-melting tank 12 to a position higher than the liquid surface of the molten glass, and includes a through hole 98d in the vicinity of the bottom surface of the first glass-melting tank 12.

The respective lower partition plates 98c each block passage in the vicinity of the bottom surface of the first glass-melting tank 12 and allow passage of molten glass in the vicinity of the liquid surface only.

The respective lower partition plates 98c are arranged between the partition plate 98a and the pair of upper partition plates 98b, and the ascending conduit 18 and the descending conduit 20 are arranged between the respective lower partition plates 98c and the partition plate 98a. Thus, the ascending conduit 18 and the descending conduit 20 are separated by the partition plate 98a, and arranged between the partition plate 98a and a pair of lower partition plates 98c adjacent to the partition plate 98a. Each lower partition plate 98c is provided so as to stand from the bottom surface of the first glass-melting tank 12 to a position lower than the liquid surface of the molten glass.

Figure 12:
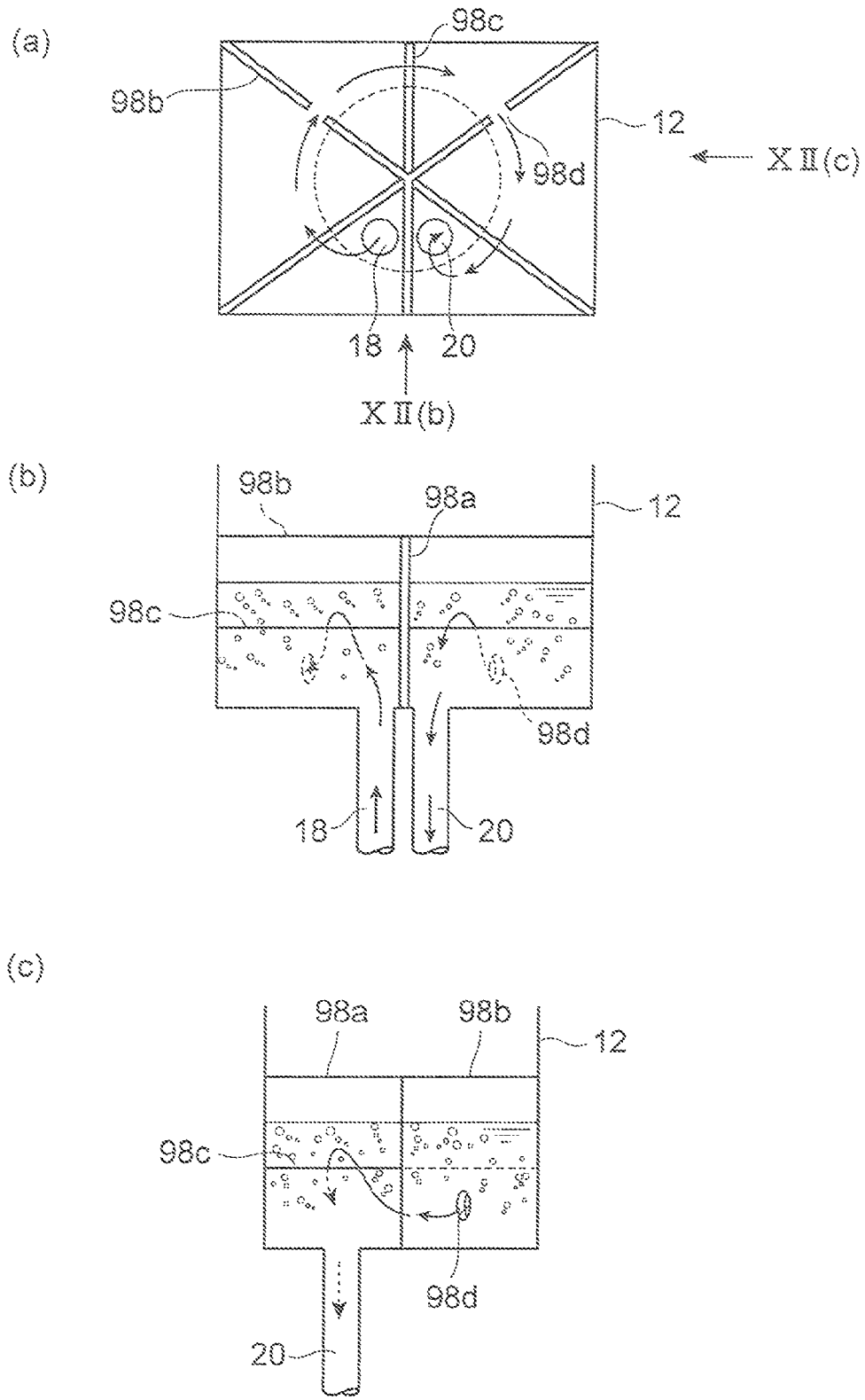
FIG. 12 includes diagrams showing a flow of molten glass inside a first glass-melting tank.

As illustrated in FIG. 12, when molten glass flows into the first glass-melting tank 12 from the ascending conduit 18, communication between the ascending conduit 18 and the descending conduit 20 is blocked by the partition plate 98a, and thus, the molten glass passes through the two upper partition plate 98b and the three lower partition plates 98c and flows out to the descending conduit 20. In other words, when the molten glass flows into the first glass-melting tank 12 from the ascending conduit 18, first, only molten glass in the vicinity of the liquid surface climbs over a first lower partition plate 98c, and then, only the molten glass in the vicinity of the bottom surface of the first glass-melting tank 12 passes through the through hole 98d formed in the first upper partition plate 98b, and next, only the molten glass in the vicinity of the liquid surface climbs over a second lower partition plate 98c, and next, only the molten glass in the vicinity of the bottom surface of the first glass-melting tank 12 passes through the through hole 98d formed in the second upper partition plate 98b, and next, only molten glass in the vicinity of the molten glass climbs over a third lower partition plate 98c, and subsequently is led out from the first glass-melting tank 12 to the descending conduit 20.

As described in detail above, in the glass-melting device 510 according to the present embodiment, providing the upper partition plates 98b enables bubbles floating as a result of being removed from molten glass to be prevented from going with the flow of the molten glass, and thus, the bubbles can be prevented from flowing into the descending conduit 20.

Furthermore, as a result of the lower partition plates 98c being provided, the molten glass does not flow into the descending conduit 20 unless the molten glass climbs over the lower partition plates 98c, and thus, in the first glass-melting tank 12, retention time sufficient for removing bubbles from the molten glass can be secured. In addition, the bubbles removed from the molten glass can be prevented from being carried by a fast flow at the bottom part of the first glass-melting tank 12 and flowing into the descending conduit 20.

As a result, mixing of bubbles into a spun glass fiber can more effectively reduced.

In the glass-melting device for producing glass fibers according to the present invention, while the flow rate of the molten glass is very small, preferably, the first glass-melting tank 12 is also made to be small. The molten glass can effectively be deformed by properly setting the volumes of the respective glass-melting tanks or the temperatures of the molten glass in the respective glass-melting tanks, melting glass raw materials in the second glass-melting tank 14, and as necessary, providing the upper partition plates 98b and the lower partition plates 98c in the first glass-melting tank 12, and thus, the first glass-melting tank 12 can be downsized.

In this case, since the flow rate of the molten glass is very small, the first glass-melting tank 12 can sufficiently be downsized by designing the device so that the area of the liquid surface of molten glass in the first glass-melting tank 12 relative to the flow rate of the molten glass has a relatively large value such as $20(m^2 \cdot hour/ton)$ to $200(m^2 \cdot hour/ton)$.

Seventh Embodiment

Next, a seventh embodiment will be described with reference to FIGS. 13 and 14. A glass-melting device 610 for producing glass fibers according to the seventh embodiment has a configuration that is basically the same as that of the glass-melting device 10 for producing glass fibers according to the first embodiment. Thus, points of difference from the first embodiment will be described below, and a description of points that are the same as the first embodiment will be omitted.

Figure 13:
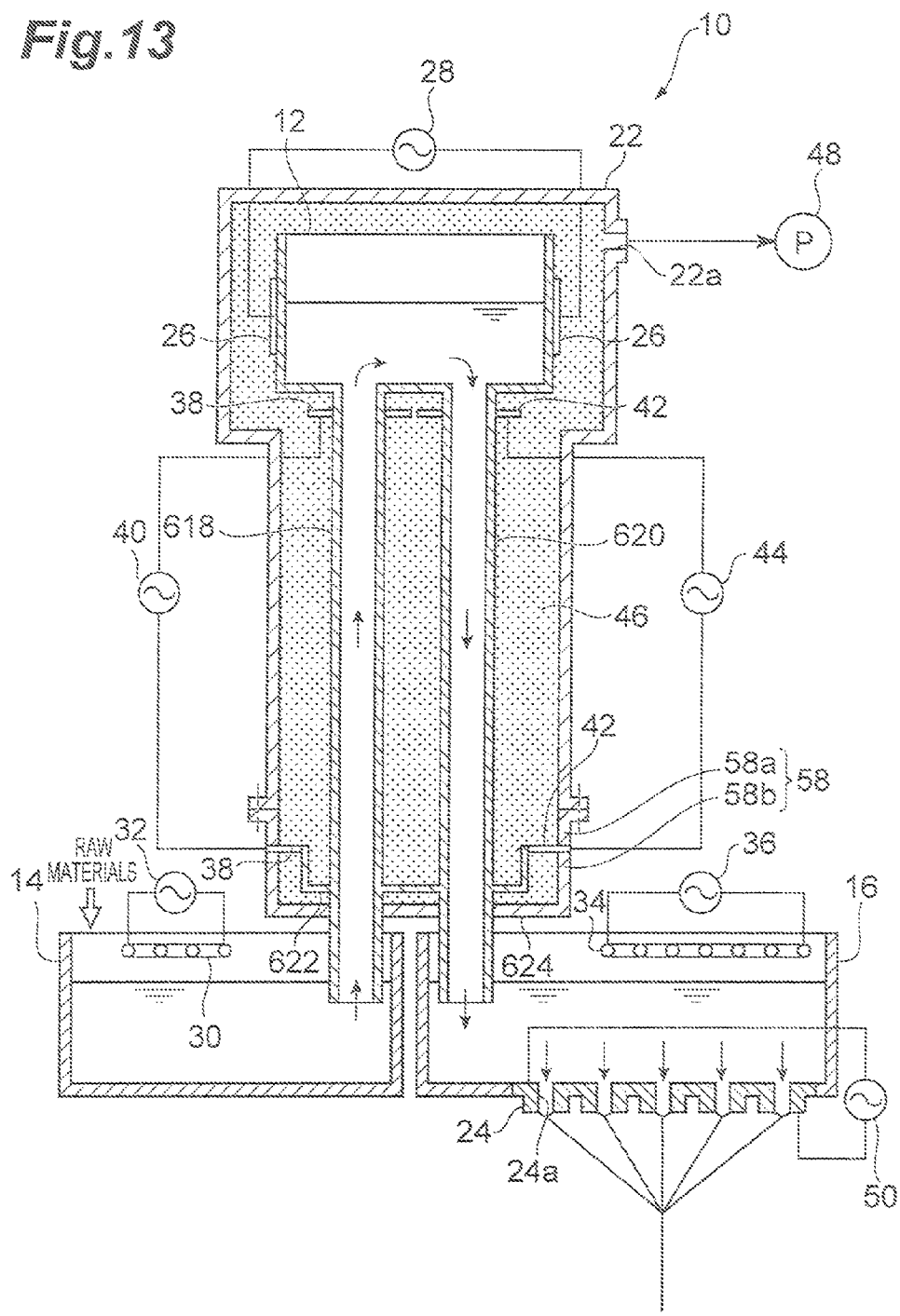
FIG. 13 is a cross-sectional diagram showing a configuration of a glass-melting device for producing glass fibers according to a seventh embodiment.
Figure 14:
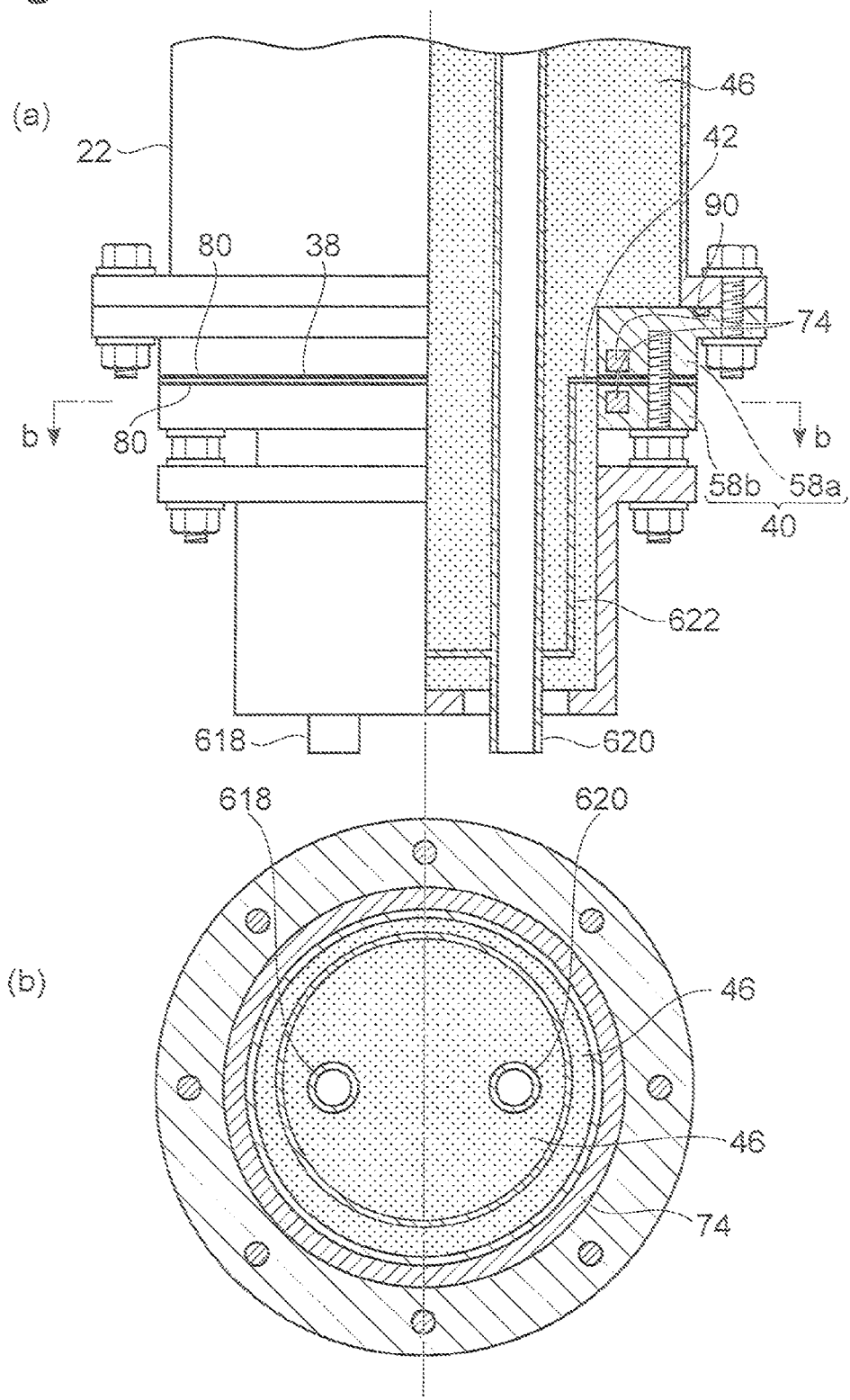
FIGS. 14(a) and 14(b) include diagrams showing a manner of connection between conduits and a decompression housing at lower parts of the conduits.

FIG. 13 is a cross-sectional diagram showing a configuration of a glass-melting device for producing glass fibers according to a seventh embodiment. FIG. 14 includes diagrams showing a manner of connection between conduits and a decompression housing at lower parts of the conduits: FIG. 14(a) is a partially-fractured front view; and FIG. 14(b) is a cross-sectional diagram along line b-b of FIG. 14(a). As illustrated in FIGS. 13 and 14, the glass-melting device 610 for producing glass fibers includes a first glass-melting tank 12, a second glass-melting tank 14, a third glass-melting tank 16, an ascending conduit 618, a descending conduit 620, a decompression housing 22 and a bushing 24.

As in the first embodiment, the ascending conduit 618 sends up molten glass resulting from melting in the second glass-melting tank 14 to deliver the molten glass to the first glass-melting tank 12, and is formed in an elongated cylindrical shape extending downward from the first glass-melting tank 12 to the second glass-melting tank 14.

As in the first embodiment, the descending conduit 620 sends the molten glass down from the first glass-melting tank 12 to deliver the molten glass to the third glass-melting tank 16, and is formed in an elongated cylindrical shape extending downward from the first glass-melting tank 12 to the third glass-melting tank 16.

At lower end parts of the ascending conduit 618 and the descending conduit 620, a conduit branch part 622 branching from the ascending conduit 618 and the descending conduit 620 is formed.

The conduit branch part 622 is bent in the vicinity of the lower end parts of the decompression housing 22 so as to cover the ascending conduit 618 and the descending conduit 620 from the lower end parts of the ascending conduit 618 and descending conduit 620. The conduit branch part 622 is spaced a predetermined distance from the ascending conduit 618 and the descending conduit 620 and is formed in a cylindrical shape extending upward in a vertical direction along the ascending conduit 618 and the descending conduit 620. Thus, the ascending conduit 618 and the conduit branch part 622 are included in a double tube. An edge of the conduit branch part 622 is connected to an electrode part 38(42) sandwiched by an upper flange 58a and a lower flange 58b between the ascending conduit 618 and the descending conduit 620, and water-cooled tubes 74. Thus, the electrode part 38(42), and the ascending conduit 618 and the descending conduit 620 are spaced from each other by a predetermined distance. Consequently, airtightness is maintained between the lower parts of the ascending conduit 618 and the descending conduit 620, and the decompression housing 22, by the electrode part 38(42) sandwiched by the conduit branch part 622, and the upper flange 58a and the lower flange 58b in an airtight manner. Thus, a reduced-pressure atmosphere is provided between the ascending conduit 618 and the descending conduit 620, and the conduit branch part 622 by means of suction by the sucking device 48. As with the ascending conduit 618 and the descending conduit 620, the conduit branch part 622 is formed of a material that generates heat upon current being applied thereto, for example, platinum or a platinum alloy. Thus, current is applied to the ascending conduit 618 and the descending conduit 620 from the electrode part 38(42) via the conduit branch part 622.

A heat insulating material 46 accommodated between the decompression housing 22, and the ascending conduit 618 and the descending conduit 620 is also accommodated between the ascending conduit 618 and the descending conduit 620, and the conduit branch part 622. Thus, the heat insulating material 46 is arranged in a space formed between the electrode part 38(42), and the ascending conduit 618 and the descending conduit 620. Consequently, an effect of a cooling action by the water-cooled tubes 74 provided in the upper flange 58a and the lower flange 58b imposed on the ascending conduit 618 and the descending conduit 620 can be reduced.

Furthermore, a housing 624 covering the conduit branch part 622 is connected to the lower flange 58b, and the heat insulating material 46 is also accommodated between the housing 624 and the conduit branch part 622. Consequently, the efficiency of heating the conduit branch part 622 can be enhanced. A region between the conduit branch part 622 and the housing 624 and a region between the conduit branch part 622 and the ascending conduit 618 and the descending conduit 620 are separated from each other by the conduit branch part 622, and thus, the region between the conduit branch part 622 and the housing 624 does not have a reduced-pressure atmosphere even if suction is conducted by the sucking device 48.

Figure 15:
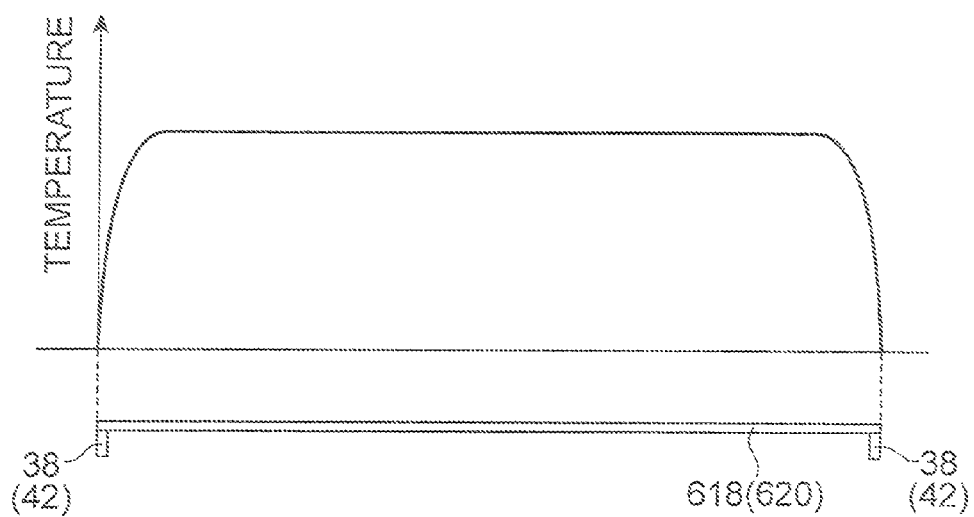
FIG. 15 showing a temperature distribution in an ascending conduit or a descending conduit interposed between a pair of electrode parts.

FIG. 15 illustrates a temperature distribution of the ascending conduit and the descending conduit each sandwiched by a pair of electrode parts. In FIG. 15, for the sake of simplicity, the ascending conduit 618 and the descending conduit 620 are illustrated in a state in which the ascending conduit 618 and the descending conduit 620 are linearly extended. As illustrated in FIG. 15, upon being heated as a result of current being applied from the pair of electrode parts 38(42), the temperature of central parts of the ascending conduit 618 and the descending conduit 620, at which the temperature gradient is small, is raised to a set temperature, while the temperature of parts of the ascending conduit 618 and the descending conduit 620 around the parts of connection with the electrode parts 38(42) become lower toward end parts thereof because of the large temperature gradient. Here, at a part of the descending conduit 620 in the vicinity of the electrode part 42 arranged on the first glass-melting tank 12 side, excessive cooling of the ascending conduit 618 and the descending conduit 620 can be prevented by the amount of heat brought by the molten glass introduced by the second glass-melting tank 14 and the first glass-melting tank 12. However, a part of the ascending conduit 618 in the vicinity of a part of connection with the electrode part 38 arranged on the first glass-melting tank 12 side, and a part of the descending conduit 620 in the vicinity of the electrode part 42 arranged on the third glass-melting tank 16 side only have a small amount of brought heat, and thus, may be excessively cooled if the temperature becomes lower than the set temperature. Therefore, the electrode part 38(42) is connected to the edge of the conduit branch part 622 branching from the lower end parts of the ascending conduit 618 and the descending conduit 620, enabling providing a predetermined distance between the part of connection with the electrode part 38(42), and the ascending conduit 618 and the descending conduit 620, and the temperature of the lower end parts of the ascending conduit 618 and the descending conduit 620 can be raised to the stable set temperature. Consequently, the temperature of the molten glass introduced into the ascending conduit 618 and the descending conduit 620 can properly be raised. From the perspective of securing a region for heating molten glass in the ascending conduit 618 and the descending conduit 620, it is preferable to set a position where the conduit branch part 622 branches from the ascending conduit 618 and the descending conduit 620 to be as low as possible.

The present invention is not limited to the above-described embodiments, and various variations are possible.

For example, various combinations of the first to seven embodiments are possible. More specifically, the conduit parts according to the fourth embodiment or the fifth embodiment can be provided while the heat-insulating housing according to the second embodiment being employed. Alternatively, the partition plates in the first glass-melting tank according to the sixth embodiment can be provided while the conduits according to the second to fifth embodiments being provided. Alternatively, the structure of the conduit branch part according to the seventh embodiment can be provided to the conduits according to the second to sixth embodiments.

Furthermore, for example, although the above embodiments have been described in terms of a case where one sucking device is provided, a sucking device for reducing the pressure in the first glass-melting tank and a sucking device for reducing the pressures in the conduits may be separately provided.

Furthermore, although the above embodiments have been described in terms of a case where the integrated ascending and descending conduits are separated inside the housing, the ascending and descending conduits may be separated outside the housing.

Furthermore, although the seventh embodiment has been described in terms of a case where the conduit branch part is formed in such a manner that the conduit branch part branches from both of the ascending conduit and the descending conduit, the conduit branch part may be formed so as to branch from only any one of the upper conduit and descending conduit.

INDUSTRIAL APPLICABILITY

The present invention can be employed for a glass-melting device for producing glass fibers, which melts glass raw materials to spin a glass fiber.

REFERENCE SIGNS LIST

10 . . . glass-melting device for producing glass fibers, 12 . . . first glass-melting tank, 14 . . . second glass-melting tank, 16 . . . third glass-melting tank, 18 . . . ascending conduit, 20 . . . descending conduit, 22 . . . decompression housing, 22a . . . suction opening, 24 . . . bushing, 24a . . . nozzle, 26 . . . electrode part, 28 . . . power supply, 30 . . . heating wire, 32 . . . power supply, 34 . . . heating wire, 36 . . . power supply, 38 . . . electrode part, 40 . . . power supply, 42 . . . electrode part, 44 . . . power supply, 46 . . . heat insulating material, 48 . . . sucking device, 50 . . . power supply, 52 . . . ascending conduit part, 54 . . . descending conduit part, 56 . . . electrode part, 58 . . . flange, 58a . . . upper flange, 58b . . . lower flange, 60 . . . inflow communication hole, 62 . . . outflow communication hole, 64 . . . partition plate, 66 . . . upper partition plate, 68 . . . through hole, 70 . . . decompression housing, 70a . . . suction opening, 72 . . . heat-insulating housing, 72a . . . lower end, 74 . . . water-cooled tube, 76 . . . ascending conduit part, 78 . . . descending conduit part, 82 . . . ascending conduit part, 84 . . . descending conduit part, 86 . . . electrode part, 88 . . . power supply, 90 . . . O-ring, 94 . . . inflow communication hole, 96 . . . outflow communication hole, 98a . . . partition plate, 98b . . . upper partition plate, 98c . . . lower partition plate, 98d . . . through hole, 110, 210,310,410,510,610 . . . glass-melting device for producing glass fibers, 618 . . . ascending conduit part, 620 . . . descending conduit part, 624 . . . conduit branch part.

The invention claimed is:

1. A glass-melting device for producing glass fibers comprising:
a first glass-melting tank that is exposed to a reduced-pressure atmosphere by a sucking device;
a first conduit part and a second conduit part extending downward from the first glass-melting tank;
a heat-insulating housing integrally covering the first conduit part and the second conduit part;
a second glass-melting tank provided below the first conduit part and exposed to an atmospheric-pressure atmosphere;
a third glass-melting tank provided below the second conduit part and exposed to an atmospheric-pressure atmosphere;
a bushing provided at a bottom part of the third glass-melting tank, the bushing including a number of nozzles; and
heating means for separately heating at least any one of the first conduit part and the second conduit part, the first glass-melting tank, the second glass-melting tank, the third glass-melting tank and the bushing,
wherein a sum of a horizontal area of the second glass-melting tank and a horizontal area of the third glass-melting tank is ten times or more than a horizontal area of the first glass-melting tank.

2. The glass-melting device for producing glass fibers according to claim 1, wherein a pressure inside the heat-insulating housing is reduced by sucking means.

3. The glass-melting device for producing glass fibers according to claim 1, wherein the heating means includes an electrode part on each of an upper part and a lower part of at least any one of the first conduit part and the second conduit part, and applies current to the electrode parts, thereby heating the electrode parts.

4. The glass-melting device for producing glass fibers according to claim 1,
wherein a conduit branch part branches and extends upward from a lower part of at least any one of the first conduit and the second conduit; and
the heating means includes an electrode part on each of an upper part of at least any one of the first conduit part and the second conduit part or the first melting tank, and the conduit branch part, and applies current to the electrode parts, thereby heating the electrode parts.

5. The glass-melting device for producing glass fibers according to claim 1, wherein the first conduit part and the second conduit part are at least partially integrally configured.

6. The glass-melting device for producing glass fibers according to claim 5, wherein the first conduit part and the second conduit part form a double-tube structure, and at least any one of the first conduit part and the second conduit part is arranged in an inner part of any other one of the first conduit part and the second conduit part.

7. The glass-melting device for producing glass fibers according to claim 6
wherein the first conduit part is arranged on an outer side of the double-tube structure; and
wherein the second conduit part is arranged on an inner side of the double-tube structure.

8. The glass-melting device for producing glass fibers according to claim 5, wherein the first conduit part and the second conduit part are integrally joined to each other.

9. The glass-melting device for producing glass fibers according to claim 8, wherein the first conduit part and the second conduit part are formed inside one conduit by forming a partition wall inside the conduit.

10. The glass-melting device for producing glass fibers according to claim 1, wherein the first glass-melting tank is provided with at least any one of an upper partition plate forming an opening at a bottom part of the first glass-melting tank and dividing an upper part of molten glass, and a lower partition plate including an opening in the vicinity of a liquid surface of molten glass and dividing the bottom part of the first glass-melting tank.

* * * * *